(12) United States Patent
Aijaz

(10) Patent No.: US 11,419,084 B1
(45) Date of Patent: Aug. 16, 2022

(54) TIME SYNCHRONIZATION IN HYBRID WIRED-WIRELESS TIME-SENSITIVE NETWORKING

(71) Applicant: Kabushiki Kaisha Toshiba, Tokyo (JP)

(72) Inventor: Adnan Aijaz, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/162,302

(22) Filed: Jan. 29, 2021

(51) Int. Cl.
*H04L 12/26* (2006.01)
*H04W 56/00* (2009.01)

(52) U.S. Cl.
CPC .................................. *H04W 56/004* (2013.01)

(58) Field of Classification Search
CPC ..... H04L 1/0061; H04L 12/403; H04W 84/18
See application file for complete search history.

(56) References Cited

U.S. PATENT DOCUMENTS

2007/0140127 A1* 6/2007 Frei ....................... H04J 3/0655
370/238
2009/0086764 A1* 4/2009 Lee ........................ H04J 3/0667
370/503
2018/0132234 A1 5/2018 Cavalcanti et al.

FOREIGN PATENT DOCUMENTS

| WO | WO 2018/203923 A1 | 11/2018 |
| WO | WO 2019/166081 A1 | 9/2019 |
| WO | WO 2020/021309 A1 | 1/2020 |

* cited by examiner

*Primary Examiner* — Jamal Javaid
(74) *Attorney, Agent, or Firm* — Oblon, McClelland, Maier & Neustadt, L.L.P.

(57) ABSTRACT

A method for transporting time synchronization information in a wireless network comprising a first wireless node and a second wireless node. The method comprising: transmitting, by the first wireless node, a first message at a first time, the first message comprising a first timestamp; receiving, by the second wireless node, the first message at a second time; transmitting, by the second wireless node, a second message at a third time in response to receiving the first message, the second message comprising a second timestamp. The method further comprising transmitting, by the first wireless node, a third message; receiving by the second wireless node, the third message; and generating a timing correction value based, in part, on the contents of the first message, the second message and the third message.

20 Claims, 10 Drawing Sheets

TIME SYNCHRONIZATION IN HYBRID WIRED-WIRELESS TIME-SENSITIVE NETWORKING

FIELD

Embodiments described herein relate generally to a method and system for transporting time synchronization information in a wireless network.

BACKGROUND

Industry 4.0 refers to a new phase in the industrial revolution that focuses on interconnectivity, automation, machine learning, and real-time data. Factories-of-the-Future (FoF) embody Industry 4.0 and help manufacturers to increase levels of automation, improve monitoring, enable self-diagnosis and facilitate new levels of analysis.

Many applications in the Factories-of-the-Future (FoF) rely on synchronized real-time coordination amongst multiple devices (e.g. belt conveyers, assemblers, picking, welding) in order to ensure correct execution of tasks. In order to achieve this, the nodes in the network must be synchronized in time with little or no error.

Industrial Ethernet has previously been used to facilitate real-time communication in industrial networks. Time Sensitive Networking (TSN) is a set of standards being developed with the aim to improve the real-time capabilities of standard Ethernet. Time Sensitive Networking (TSN) provides for guaranteed data delivery with deterministic and bounded latency as well as extremely low data loss. As a result, Time Sensitive networking (TSN) supports both time-critical and best-effort traffic over a standard Ethernet network.

Industrial control systems have often used wired networks, in particular Industrial Ethernet, to exchange data. This approach typically involves considerable costs, both for installation and on-going maintenance. Furthermore, various new industrial control applications are emerging that are characterized by the requirements of mobility and flexibility. Wired technologies are not feasible for such control applications.

To this end, wireless communication technologies have been suggested as an alternative. Unlike wired communication networks, wireless networks typically have lower installation and maintenance costs, and provide increased flexibility in where the network nodes are deployed. Cellular wireless technologies like 5G New Radio (NR) are seen as a possible wireless communication protocol for use in the Factories-of-the-Future (FOF).

Consequently, the integration of Time Sensitive Networking (TSN) and high-performance wireless technologies is crucial for transforming industrial systems for use in the Factories-of-the-Future (FoF). However, various challenges can arise when integrating Time Sensitive Networking (TSN) with cellular wireless technologies like 5G New Radio (NR) or non-cellular industrial wireless technologies based on Wi-Fi, Bluetooth, etc One challenge is accurate inter-system time synchronization since previous approaches to time-synchronisation, based on the IEEE 802.1AS standard, cannot be directly extended to integrated Time Sensitive Networking (TSN) and wireless systems. For this reason a new approach to inter-system time synchronization is required.

Arrangements of the embodiments will be understood and appreciated more fully from the following detailed description, made by way of example only and taken in conjunction with drawings in which.

Figure 5:
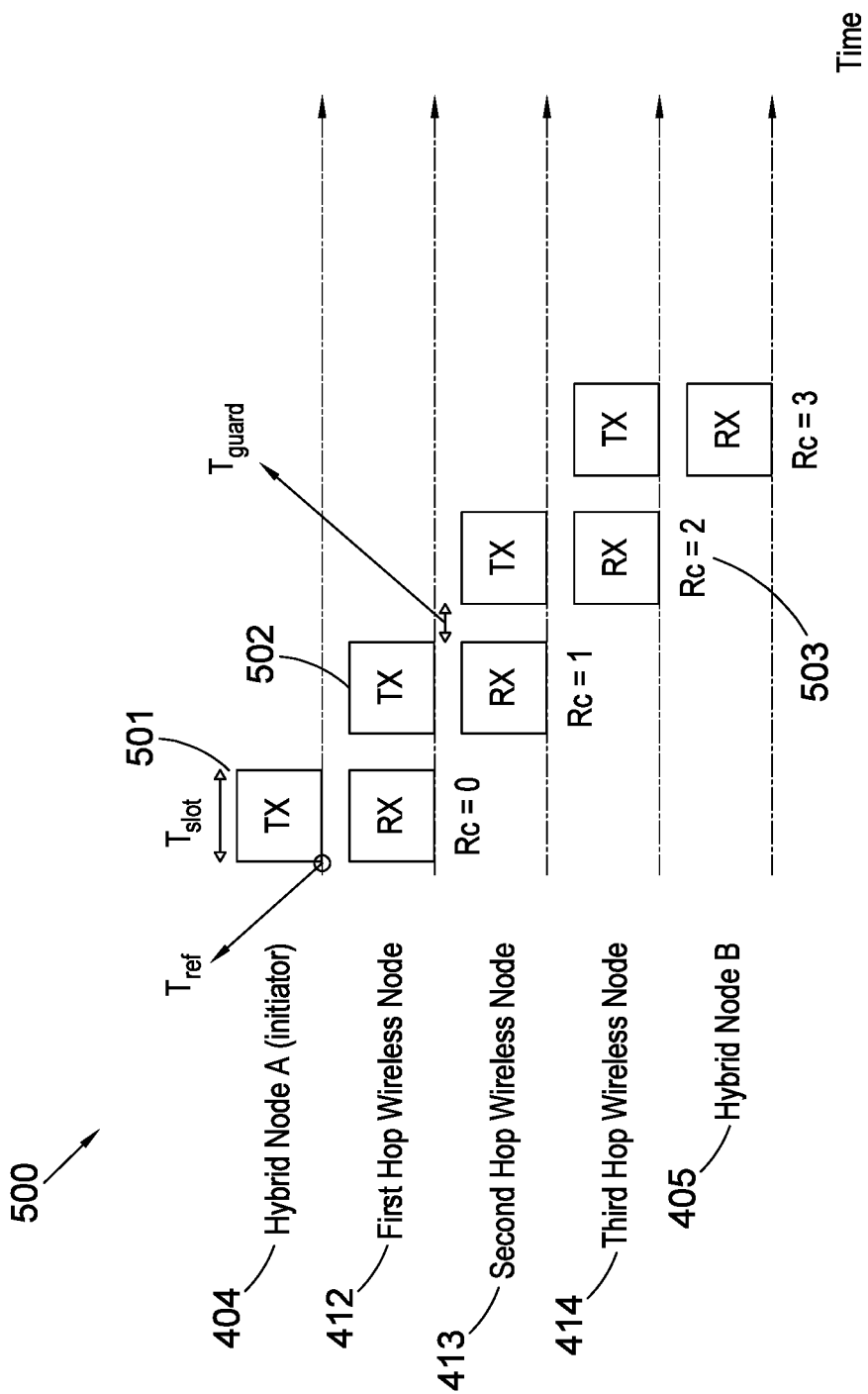
Figure 6:
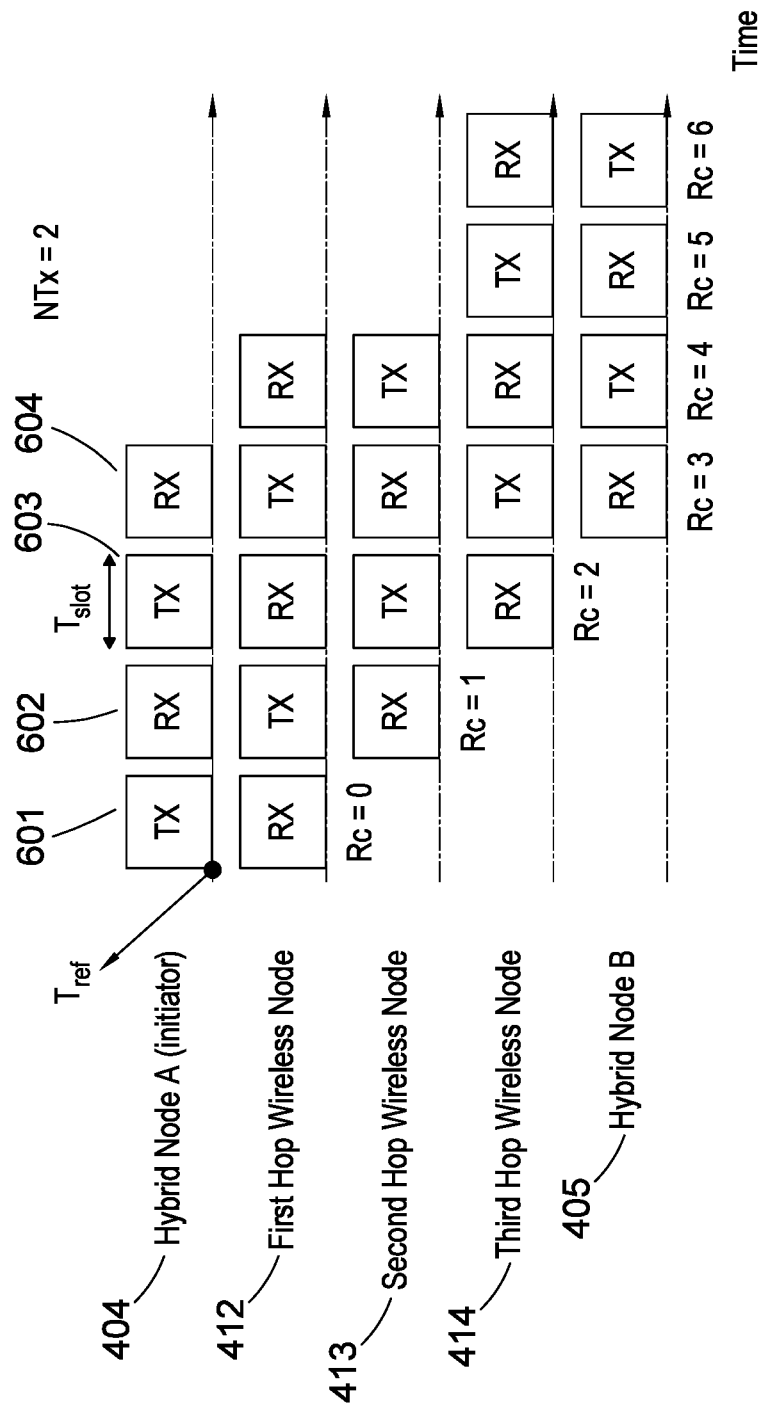
Figure 7:
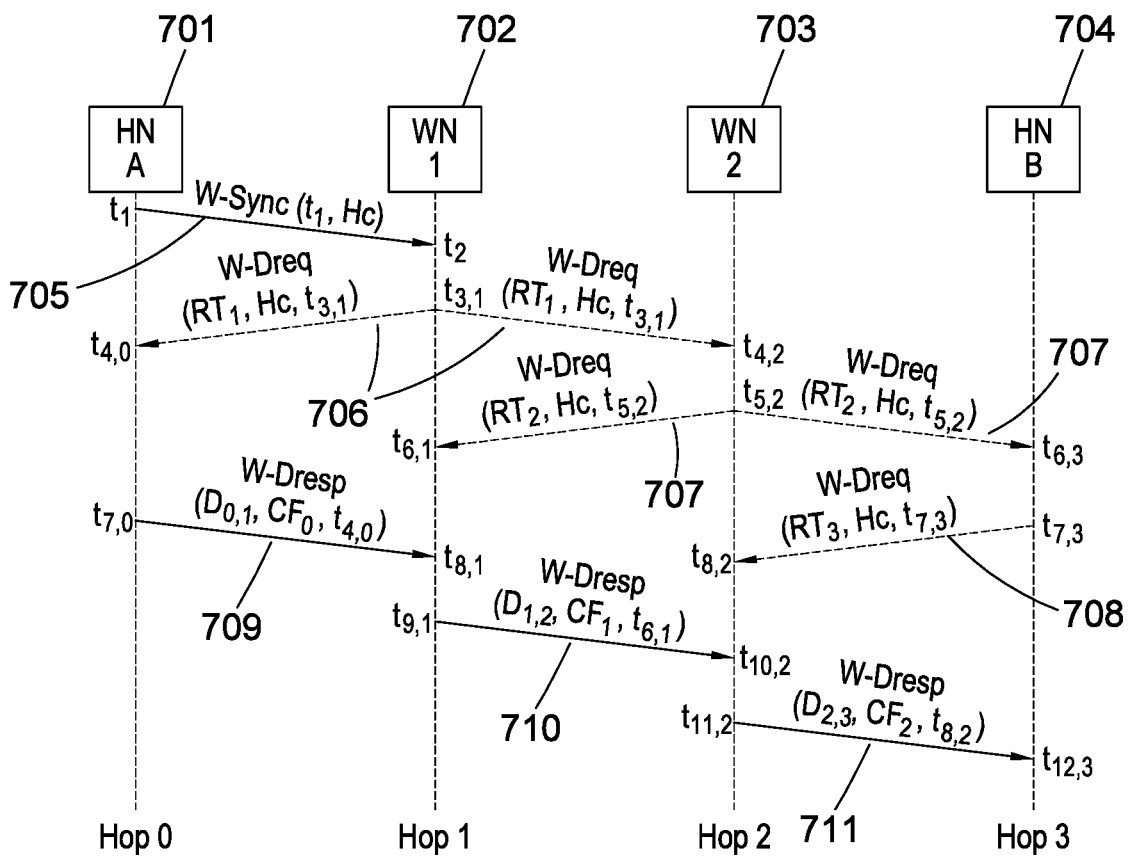
Figure 8A:
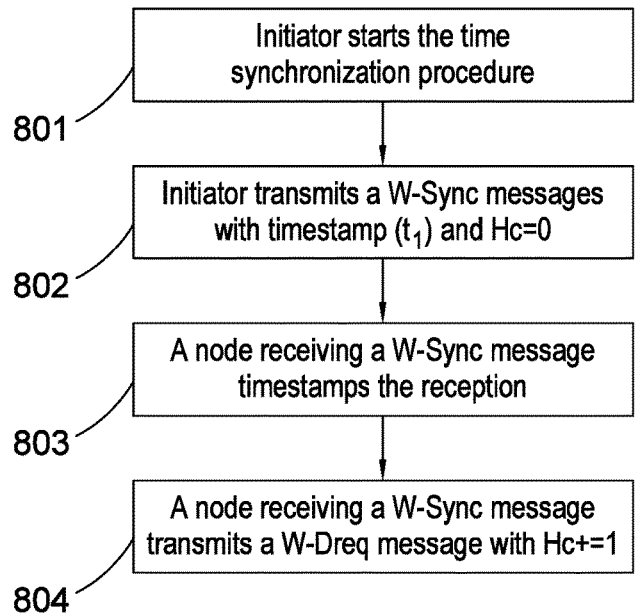
Figure 8B:
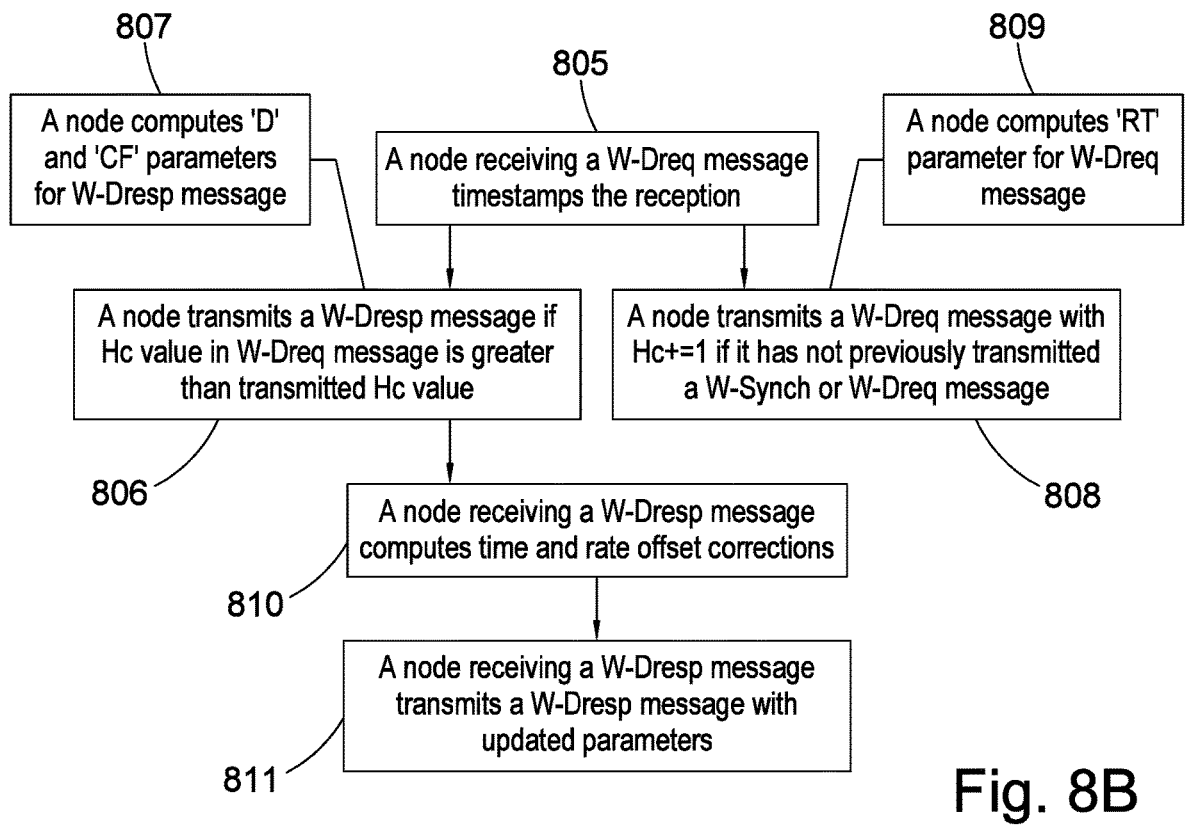
Figure 9:
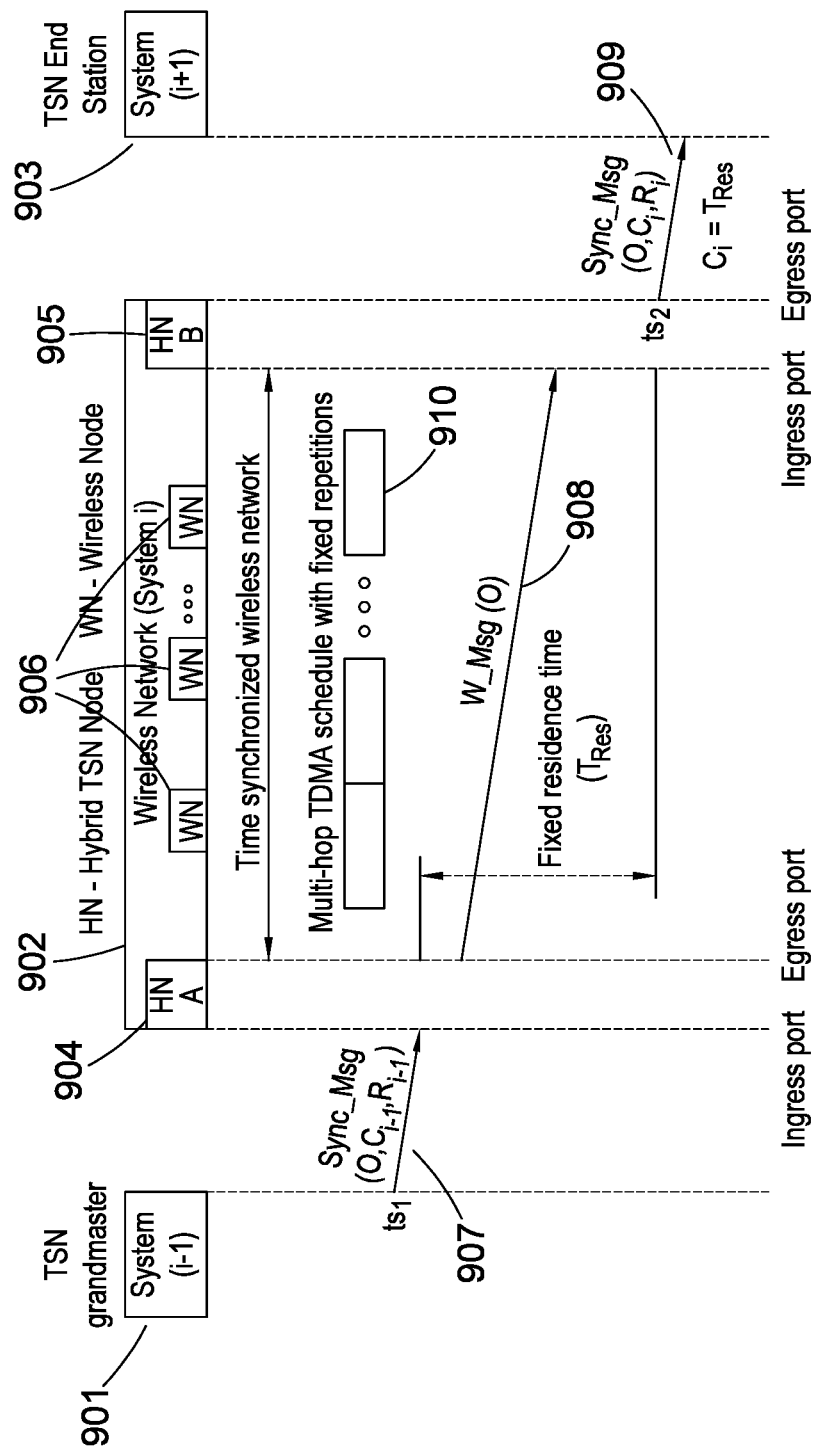
Figure 10:
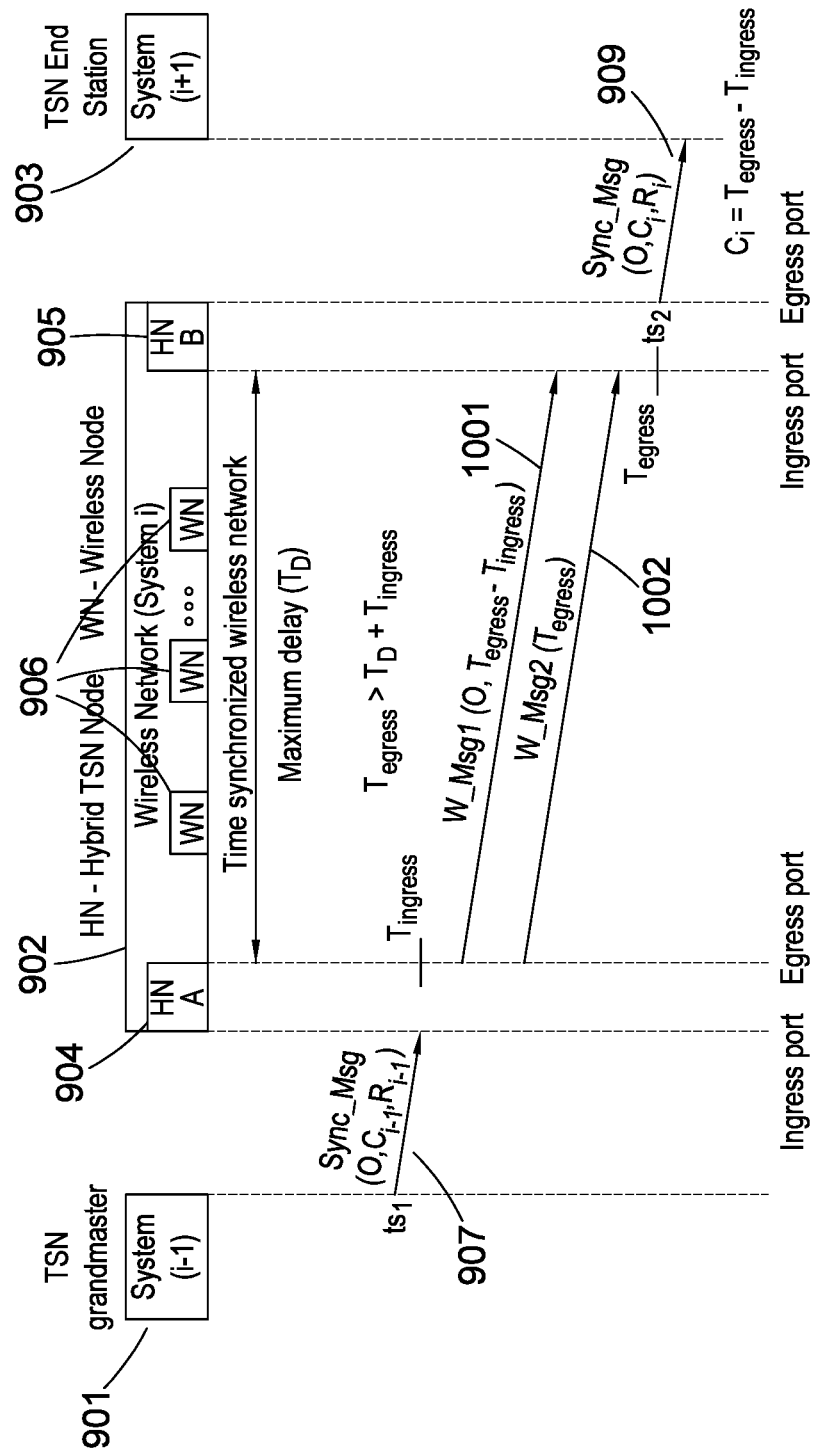
Figure 11A:
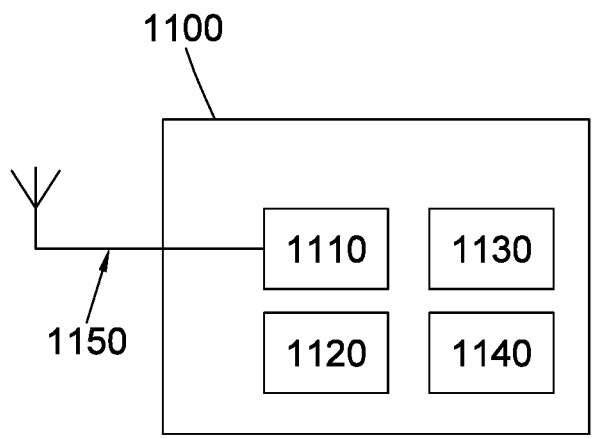

FIG. 5 a Time Division Multiple Access (TDMA) schedule for communicating time synchronization information across a multi-hop wireless network according to an embodiment;

FIG. 6 shows a flooding-based technique for communicating time synchronization information across a multi-hop wireless network according to an embodiment;

FIG. 7 shows an exchange of messages exchanged during timing synchronization across a wireless network comprising transparent clocks according to an embodiment;

FIG. 8A shows a method of initiating time synchronization in a wireless network comprising transparent clocks according to an embodiment;

FIG. 8B shows a second part of the method of time synchronization in a wireless network comprising transparent clocks according to an embodiment;

FIG. 9 shows a method of performing time synchronization across a multi-hop wireless network using deterministic Quality of Service (Qos) techniques according to an embodiment;

FIG. 10 shows a method of performing time synchronization across a multi-hop wireless network using deterministic Quality of Service (QoS) techniques according to an embodiment;

FIG. 11A shows a wireless node according to an embodiment; and

Figure 11B:
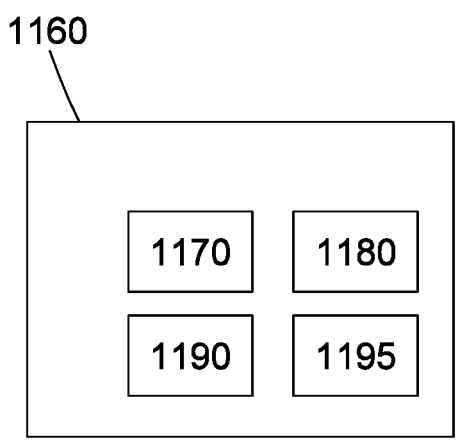

FIG. 11B shows a system for communicating with a hybrid TSN node according to an embodiment.

DETAILED DESCRIPTION

According to a first aspect there is provided a method for transporting time synchronization information in a wireless network (402) comprising a first wireless node (404; 701) and a second wireless node (412; 702). The method comprising: transmitting, by the first wireless node (404; 701), a first message (408; 705) at a first time ($t_4$; $t_1$), the first message (408; 705) comprising a first timestamp; receiving, by the second wireless node (412; 702), the first message (408; 705) at a second time ($t_2$); transmitting, by the second wireless node (412; 702), a second message (706) at a third time ($t_{3,1}$) in response to receiving the first message (408; 705), the second message (706) comprising a second timestamp; transmitting, by the first wireless node (404; 701), a third message (409; 709); receiving by the second wireless node (412; 702), the third message (409; 709); and generating a timing correction value based, in part, on the contents of the first message (408; 705), the second message (706) and the third message (409; 709).

In an embodiment each wireless node in the wireless network is a communication apparatus.

In an embodiment the method further comprises: receiving, by the first wireless node (701), the second message (706) at a fourth time ($t_{4,0}$); and wherein: the first timestamp equals the first time ($t_1$); the second timestamp equals the third time ($t_{3,1}$); the third message (709) is transmitted by the first wireless node (701) in response to receiving the second message (706), wherein: the third message comprises the fourth time ($t_{4,0}$); and generating the timing correction value comprises: calculating, by the second wireless node (702), a timing offset between the first wireless node (701) and the second wireless node (702) based on a difference between: the second time ($t_2$) minus the first time ($t_1$); and the fourth time ($t_{4,0}$) minus the third time ($t_{3,1}$).

In an embodiment the timing offset is calculated according to $0.5 \times [(t_2-t_1)-(t_{4,0}-t_{3,1})]$.

In an embodiment the wireless network further comprises a third wireless node (703) and the method comprises: receiving, by the third wireless node (703), the second message (706) at a fifth time ($t_{4,2}$); transmitting, by the third wireless node (703), a fourth message (707) at a sixth time ($t_{5,2}$) in response to receiving the second message (706); receiving, by the second wireless node (702), the fourth message (707) at a seventh time ($t_{6,1}$); transmitting, by the second wireless node (702), a fifth message (710) at an eight time ($t_{9,1}$) in response to receiving the fourth message (707) and the third message (709), the fifth message (710) comprising the seventh time ($t_{6,1}$); receiving, by the third wireless node (703), the fifth message (710) at a ninth time ($t_{10,2}$); and calculating, by the third wireless node (703), a timing offset between the first wireless node (701) and the third wireless node (703).

In an embodiment the timing offset between the first wireless node (701) and the third wireless node (703) comprises a time offset and a rate offset.

In an embodiment the rate offset is added to the time offset to determine a total offset.

In an embodiment the timing offset between the first wireless node (701) and the third wireless node (703) is calculated based on a difference between: the fifth time ($t_{4,2}$) minus the third time ($t_{3,1}$); and the seventh time ($t_{6,1}$) minus the sixth time ($t_{5,2}$).

In an embodiment the timing offset between the first wireless node (701) and the third wireless node (703) is calculated according to: $0.5 \times [(t_{4,2}-t_{3,1})-(t_{6,1}-t_{5,2})]$.

In an embodiment the second message (706) comprises a residence time parameter ($RT_1$) equal to the difference between the third time ($t_{3,1}$) and the second time ($t_2$); the fifth message (710) comprises an accumulated delay parameter ($D_{12}$) based on a propagation delay between the first wireless node (701) and the second wireless node (702); and the method further comprises: calculating the rate offset by adding the residence time parameter ($RT_1$) to the accumulated delay parameter ($D_{12}$) and multiplying the sum by a clock rate of the second wireless node (702) relative to the third wireless node (703).

In an embodiment the method further comprises calculating the clock rate of the second wireless node (702) relative to the third wireless node (703) based on a difference between the eighth time ($t_{9,1}$) and the third time ($t_{3,1}$) relative to a difference between the ninth time ($t_{10,2}$) and the fifth time ($t_{4,2}$).

In the embodiment the fifth message (710) comprises a correction field ($CF_1$) equal to the difference between the eighth time ($t_{9,1}$) and the third time ($t_{3,1}$).

In an embodiment the method further comprises time synchronizing the second wireless node (702) to the first wireless node (701) based on the timing offset between the first wireless node (701) and the second wireless node (702).

In an embodiment time synchronizing the second wireless node comprises updating a clock of the second wireless node based on the timing offset between the first wireless node (701) and the second wireless node (702). The method further comprising: generating, by the second wireless node, a data message comprising a timestamp generated based on the clock of the second wireless node; and transmitting the data message by the second wireless node.

In an embodiment the method further comprises communicating, via the wireless network, an instruction message to the second wireless node, the instruction message comprising an instruction and a timestamp indicating a time to carry out the instruction; and carrying out the instruction based on the clock of the second wireless node.

In an embodiment the method further comprises: receiving, by a first wireless node (404), a first synchronization message (407) comprising an original timestamp (O) at a fifth time ($t_3$); and transmitting, by the first wireless node (404), the first message (408), in response to receiving the first synchronization message (407), wherein: the first timestamp in the first message (408) equals the original timestamp (O) and the first message (408) further comprises: a relay counter parameter (Rc) indicating a number of wireless nodes that the original timestamp (O) has traversed; and an offset parameter (ΔK) indicating a time difference between receiving the first synchronization message (407) and transmitting the first message (408); and wherein: the second timestamp in the second message equals the original timestamp (O), and the second message further comprises: the offset parameter (ΔK) and the relay counter parameter (Rc), wherein a value of the relay counter (Rc) is equal to a value of the relay counter parameter (Rc) received in the first message (408) incremented by one.

In an embodiment the wireless network (402) further comprises a hybrid node (405), and a plurality of other wireless nodes (413, 414) the method further comprises: receiving, by a node in the plurality of other wireless nodes (413, 414), the second message; and relaying, by the plurality of other wireless nodes (413, 414), the second message across the wireless network wherein each node in the plurality of other wireless nodes (413, 414) increments the value of the relay counter (Rc) upon relaying the second message; receiving, by the hybrid node (405), the second message at a sixth time ($t_5$); and transmitting, by the hybrid node (405), a second synchronization message (411) at a seventh time ($ts_2$), the second synchronization message (411) comprising: the original timestamp (O); and a correction value ($C_i$) based on the offset parameter (ΔK) received in the second message and a propagation delay across the wireless network wherein: the propagation delay is determined based on the value of the relay counter (Rc) in the second message and a property of the communication schedule.

In an embodiment the communication schedule is a Time Divisional Multiple Access schedule (500) comprising a plurality of timeslots, in which each timeslot of the plurality of timeslots has a slot duration ($T_{slot}$) and each timeslot of the plurality of timeslots is separated in time from an adjacent timeslot by a guard duration ($T_{guard}$, and wherein: the propagation delay is calculated based on the value of the relay counter (Rc) in the second message, the slot duration ($T_{slot}$) and the guard duration ($T_{guard}$).

In an embodiment the propagation delay is calculated according to: $(Rc+1) \times T_{slot} \times (Rc \times T_{guard})$, where Rc the value of the relay counter (Rc) in the second message, $T_{slot}$ is the slot duration and $T_{guard}$ is the guard duration.

In an embodiment the communication schedule is generated by flooding; the first wireless message (408) and the second message have a fixed length; the second wireless node (412) transmits the second message immediately after receiving the first message (408); each node in the plurality of other wireless nodes (413; 414) transmits the second message (408) immediately after receiving the second message (408); and wherein: the propagation delay is calculated based on a value of the relay counter (Rc) and a time taken to communicate a message having the fixed length.

In an embodiment the propagation delay is calculated according to $T_{ref}=(Rc+1)\times T_{slot}$ where Rc is the value of the relay counter (Rc) in the second message, and $T_{slot}$ equals the time taken to communicate the message having the fixed length.

In an embodiment each node in the plurality of other wireless nodes transmits the second wireless message a predetermined maximum number of times.

In an embodiment the third message (409) further comprises a second relay counter (Rc) parameter; and the method further comprises: relaying, by the second wireless node (412) and the plurality of other wireless nodes (413, 414), the third message (409) across the wireless network wherein each node increments a value of the second relay counter (Rc) parameter upon relaying the third message (409); receiving, by the hybrid node (405), the third message (409) at an eighth time ($t_7$); and transmitting, by the hybrid node (405), a third synchronization message (410) comprising a rate ratio ($R_i$) indicating a difference in clock rate between the first wireless node (404) and the hybrid node (405).

In an embodiment the third message (409) is transmitted at a ninth time ($t_6$) and the method further comprises: calculating the rate ratio ($R_i$) according to a difference between the ninth time ($t_6$) and the first time ($t_4$) divided by a difference between the eighth time ($t_7$) and the sixth time ($t_5$).

In an embodiment the first wireless node (404) comprises: an ingress port with a first timing domain; and an egress port with a second timing domain, and wherein the method further comprises: receiving the first synchronization message (407) at a tenth time ($t_2$) with respect to the first timing domain; and converting the tenth time ($t_2$) to the fifth time ($t_3$) measured with respect to the second timing domain.

In an embodiment, the correction value ($C_i$) is equal to a sum of the offset parameter ($\Delta K$) received in the second message, the propagation delay, and a residence time at the hybrid node (405) wherein: the residence equals a difference between the sixth time ($t_5$); and the seventh time ($ts_2$).

In a second aspect there is provided a non-transitory medium comprising computer program instructions suitable for execution by a processor, the instructions configured to, when executed by the processor, implement the functionality of a first wireless node (404, 701) as described above.

In a third aspect there is provided a non-transitory medium comprising computer program instructions suitable for execution by a processor, the instructions configured to, when executed by the processor, implement the functionality of a second wireless node (412; 702) as described above.

In a fourth aspect there is provided a non-transitory medium comprising computer program instructions suitable for execution by a processor, the instructions configured to, when executed by the processor, implement the functionality of a hybrid node as described above.

In a fifth aspect there is provided a system for transporting time synchronization information in a wireless network (402), the system comprising: a first wireless node (404; 701) configured to: transmit a first message (408; 705) at a first time ($t_4$; $t_1$), the first message (408; 705) comprising a first timestamp; and transmit, a third message (409; 709). The system further comprises a second wireless node (412; 702), configured to: receive the first message (408; 705) at a second time ($t_2$); transmit a second message (706) at a third time ($t_{3,1}$) in response to receiving the first message (408; 705), the second message (706) comprising a second timestamp; receive the third message (409; 709). Wherein the system is configured to: generate a timing correction value based, in part, on the contents of the first message (408; 705), the second message (706) and the third message (409; 709).

In an embodiment the first timestamp equals the first time ($t_1$); the second timestamp equals the third time ($t_{3,1}$); and the first wireless node (701) is configured to: receive the second message (706) at a fourth time ($t_{4,0}$); and transmit the third message (709) in response to receiving the second message (706); wherein the third message comprises the fourth time ($t_{4,0}$). In the system the second wireless node (702) is configured to: generate the timing correction value by calculating a timing offset between the first wireless node (701) and the second wireless node (702) based on a difference between: the second time ($t_2$) minus the first time ($t_1$); and the fourth time ($t_{4,0}$) minus the third time ($t_{3,1}$).

In an embodiment the system further comprises a third wireless node (703) configured to: receive the second message (706) at a fifth time ($t_{4,2}$); transmit a fourth message (707) at a sixth time ($t_{5,2}$) in response to receiving the second message (706); receive, a fifth message (710) at a ninth time ($t_{10,2}$); and calculate, a timing offset between the first wireless node (701) and the third wireless node (703). In the system the second wireless node (702) is further configured to: receive, the fourth message (707) at a seventh time ($t_{6,1}$); and transmit the fifth message (710) at an eight time ($t_{9,1}$) in response to receiving the fourth message (707) and the third message (709), the fifth message (710) comprising the seventh time ($t_{6,1}$).

In an embodiment the timing offset between the first wireless node (701) and the third wireless node (703) comprises a time offset and a rate offset.

In an embodiment the third wireless node (703) is configured to calculate the timing offset between the first wireless node (701) and the third wireless node (703) based on a difference between: the fifth time ($t_{4,2}$) minus the third time ($t_{3,1}$); and the seventh time ($t_{6,1}$) minus the sixth time ($t_{5,2}$).

In an embodiment the second message (706) comprises a residence time parameter ($RT_1$) equal to the difference between the third time ($t_{3,1}$) and the second time ($t_2$); the fifth message (710) comprises an accumulated delay parameter ($D_{12}$) based on a propagation delay between the first wireless node (701) and the second wireless node (702); and the third wireless node (703) is further configured to: calculate the rate offset by adding the residence time parameter ($RT_1$) to the accumulated delay parameter ($D_{12}$) and multiplying the sum by a clock rate of the second wireless node (702) relative to the third wireless node (703).

In an embodiment the third wireless node (703) is configured to calculate the clock rate of the second wireless node (702) relative to the third wireless node (703) based on a difference between the eighth time ($t_{9,1}$) and the third time ($t_{3,1}$) relative to a difference between the ninth time ($t_{10,2}$) and the fifth time ($t_{4,2}$).

In an embodiment the fifth message (710) comprises a correction field ($CF_1$) equal to the difference between the eighth time ($t_{9,1}$) and the third time ($t_{3,1}$).

In an embodiment the second wireless node (702) is configured to time synchronise to the first wireless node (701) based on the timing offset between the first wireless node (701) and the second wireless node (702).

In an embodiment the first wireless node (404) is configured to: receive, a first synchronization message (407) comprising an original timestamp (O) at a fifth time ($t_3$); and transmit the first message (408) in response to receiving the first synchronization message (407), wherein: the first timestamp in the first message (408) equals the original timestamp (O) and the first message (408) further comprises: a relay counter parameter (Rc) indicating a number of wireless nodes that the original timestamp (O) has traversed; and an offset parameter ($\Delta K$) indicating a time difference between receiving the first synchronization message (407) and transmitting the first message (408); and wherein the second timestamp in the second message equals the original timestamp (O), and the second message further comprises: the offset parameter ($\Delta K$) and the relay counter parameter (Rc), wherein a value of the relay counter (Rc) is equal to a value of the relay counter parameter (Rc) received in the first message (408) incremented by one.

In an embodiment the system further comprises a hybrid node (405), and a plurality of other wireless nodes (413, 414) wherein the plurality of other wireless nodes (413, 414) are configured to: receive the second message; and relay the second message across the wireless network wherein each node in the plurality of other wireless nodes (413, 414) increments the value of the relay counter (Rc) upon relaying the second message; and the hybrid node (405) is configured to: receive the second message at a sixth time ($t_5$); and transmit a second synchronization message (411) at a seventh time ($ts_2$), the second synchronization message (411) comprising: the original timestamp (O); and a correction value ($C_i$) based on the offset parameter ($\Delta K$) received in the second message and a propagation delay across the wireless network wherein: the propagation delay is determined based on the value of the relay counter (Rc) in the second message and a property of the communication schedule.

In an embodiment the communication schedule is a Time Divisional Multiple Access schedule (500) comprising a plurality of timeslots, in which each timeslot of the plurality of timeslots has a slot duration ($T_{slot}$) and each timeslot of the plurality of timeslots is separated in time from an adjacent timeslot by a guard duration ($T_{guard}$); and wherein: the propagation delay is calculated based on the value of the relay counter (Rc) in the second message, the slot duration ($T_{slot}$) and the guard duration ($T_{guard}$).

In an embodiment the propagation delay is calculated according to: $(Rc+1) \times T_{slot} + (Rc \times T_{guard})$, where Rc the value of the relay counter (Rc) in the second message, $T_{slot}$ is the slot duration and $T_{guard}$ is the guard duration.

In an embodiment the communication schedule is generated by flooding; the first wireless message (408) and the second message have a fixed length; the second wireless node (412) is configured to transmit the second message immediately after receiving the first message (408); and each node in the plurality of other wireless nodes (413; 414) is configured to transmit the second message (408) immediately after receiving the second message (408); and wherein: the propagation delay is calculated based on a value of the relay counter (Rc) and a time taken to communicate a message having the fixed length.

In an embodiment the propagation delay is calculated according to $T_{ref} = (Rc+1) \times T_{slot}$ where Rc is the value of the relay counter (Rc) in the second message, and $T_{slot}$ equals the time taken to communicate the message having the fixed length.

In an embodiment each node in the plurality of other wireless nodes is configured to transmit the second wireless message a predetermined maximum number of times In an embodiment the third message (409) further comprises a second relay counter (Rc) parameter; the second wireless node (412) and the plurality of other wireless nodes (413, 414) are further configured to: relay the third message (409) across the wireless network wherein each node increments a value of the second relay counter (Rc) parameter upon relaying the third message (409); and the hybrid node (405) is further configured to: receive the third message (409) at an eighth time ($t_7$) transmit a third synchronization message (410) comprising a rate ratio ($R_i$) indicating a difference in clock rate between the first wireless node (404) and the hybrid node (405).

In an embodiment the third message (409) is transmitted at a ninth time ($t_6$) and wherein the hybrid node (405) is configured to calculate the rate ratio ($R_i$) according to a difference between the ninth time ($t_6$) and the first time ($t_4$) divided by a difference between the eighth time ($t_7$) and the sixth time ($t_5$).

According to a sixth aspect there is provided a method for transporting time synchronization information across a wireless network (402) communicating according to a communication schedule. The wireless network comprising a plurality of nodes, the plurality of nodes comprising a first hybrid node (404), a second hybrid node (405), and a plurality of wireless nodes (412, 413, 414). The method comprising: receiving, by a first hybrid node (404), a first synchronization message (407) comprising an original timestamp (O) at a first time ($t_3$); transmitting, by the first hybrid node (404), a first wireless message (408) at a second time ($t_4$). The first wireless message (408) comprising: the original timestamp (O); a relay counter (Rc) indicating a number of wireless nodes that the first wireless message (408) has traversed; and an offset parameter ($\Delta K$) indicating a time difference between receiving the first synchronization message (407) and transmitting the first wireless message (408). The method further comprising relaying, by the plurality of wireless nodes (412, 413, 414), the first wireless message (408) across the wireless network wherein each wireless node increments the value of the relay counter (Rc) upon relaying the first wireless message (408); receiving, by the second hybrid node (405), the first wireless message (508) at a third time ($t_5$); and transmitting, by the second hybrid node (405), a second synchronization message (411) at a fourth time ($ts_2$). The second synchronization message (411) comprising the original timestamp (O); and a correction value ($C_i$) based on the offset parameter ($\Delta K$) and a propagation delay across the wireless network wherein: the propagation delay is determined based on the value of the relay counter (Rc) in the first wireless message (408) and the communication schedule.

In an embodiment, the correction value ($C_i$) indicates a time difference between generating the original timestamp (O) and transmitting the second synchronization message (411).

In an embodiment, the first hybrid node, the second hybrid node and the plurality of wireless nodes are communication apparatuses.

In an embodiment, the second time ($t_4$) is measured with respect to the second timing domain.

In an embodiment, the communication schedule is a Time Divisional Multiple Access schedule (500) comprising a plurality of timeslots, in which each timeslot of the plurality of timeslots has a slot duration ($T_{slot}$) and each timeslot of the plurality of timeslots is separated in time from an adjacent timeslot by a guard duration ($T_{guard}$); and wherein the propagation delay is calculated based on a value of the relay counter (Rc), the slot duration ($T_{slot}$) and the guard duration ($T_{guard}$).

In an embodiment, the propagation delay is calculated according to: $(Rc+1) \times T_{slot} + (Rc \times T_{guard})$, where Rc the value of the relay counter (Rc), $T_{slot}$ is the slot duration and $T_{guard}$ is the guard duration.

In an embodiment the communication schedule is generated by flooding, the first wireless message (408) has a fixed length, each node in the plurality of nodes transmits the first wireless message (408) immediately after receiving the first wireless message (408); and the propagation delay is calculated based on a value of the relay counter (Rc) and a time taken to communicate the first wireless message (408).

In an embodiment, the propagation delay is calculated according to $T_{ref} = (Rc+1) \times T_{slot}$ where Rc is the value of the relay counter (Rc), and $T_{slot}$ equals the time taken to communicate the first wireless message (408).

In an embodiment each node in the plurality of nodes transmits the first wireless message (408) a predetermined maximum number of times.

In an embodiment the method further comprises: transmitting, by the first hybrid node (404), at a fifth time ($t_6$), a second wireless message (409) comprising a relay counter (Rc); relaying, by the plurality of wireless nodes (412, 413, 414), the second wireless message (409) across the wireless network wherein each wireless node of the plurality of wireless nodes increments a value of the relay counter (Rc) upon relaying the second wireless message (409); receiving, by the second hybrid node (405), the second wireless message (409) at a sixth time ($t_7$); and transmitting, by the second hybrid node (405), a third synchronization message (410) comprising a rate ratio ($R_i$) indicating a difference in clock rate between the first hybrid node (404) and the second hybrid node (405).

In an embodiment, the fifth time ($t_6$) is after the second time ($t_4$).

In an embodiment, the second wireless message (409) only contains the relay counter (Rc).

In an embodiment, the method further comprises: calculating the rate ratio ($R_i$) according to a difference between the fifth time ($t_6$) and the second time ($t_4$) divided by a difference between the sixth time ($t_7$) and the third time ($t_5$).

In an embodiment the first hybrid node (404) comprises an ingress port with a first timing domain; and an egress port with a second timing domain, and the method further comprises: receiving the first synchronization message (407) at a seventh time ($t_2$) with respect to the first timing domain; and converting the seventh time to the first time ($t_3$) measured with respect to the second timing domain.

In an embodiment converting the seventh time ($t_2$) to the first time ($t_3$) comprises adding a timing difference between the first timing domain and the second timing domain ($\Delta T_1$) to the seventh time ($t_2$).

In an embodiment, the correction value ($C_i$) is equal to a sum of the offset parameter ($\Delta K$), the propagation delay, and a residence time at the second hybrid node (405) wherein: the residence equals a difference between the third time ($t_5$); and the fourth time ($ts_2$).

In an embodiment, the second hybrid node (405) comprises: a second ingress port with a third timing domain; and a second egress port with a fourth timing domain. And the method further comprises determining the residence time by: converting the third time ($t_5$) measured with respect to the third timing domain to an eighth time ($tr_0$) measured with respect to the fourth timing domain; and calculating a difference between the fourth time ($ts_2$) and the eighth time ($tr_0$).

In an embodiment the method further comprises: transmitting the first synchronization message (407) from a first system (401) comprising a first clock, wherein the first system (401) is a Time Sensitive Network Grand Master.

In an embodiment the method further comprises receiving the second synchronization message (411) at a second system (403), wherein the second system (403) is a Time Sensitive Network end station; and synchronizing a second clock of the second system (403) with the first clock of the first system (401).

In an embodiment, the method further comprises generating, by the second system (403), a data message comprising a timestamp generated based on the second clock; transmitting, by the second system (403), the data message; and relaying the data message to a destination via the wireless network.

In an embodiment, the method further comprises: communicating, via the wireless network, an instruction message to the second system (403), the instruction message comprising an instruction and a timestamp indicating a time to carry out the instruction; and carrying out the instruction based on the second clock.

According to a seventh aspect there is provided a method for time synchronizing a wireless network comprising a first node and a second node. The method comprising: transmitting, by the first node (701), a synchronisation message (705) at a first time ($t_1$), the synchronisation message (705) comprises the first time ($t_1$); receiving, by the second node (702), the synchronization message (705) at a second time ($t_2$); transmitting, by the second node (702), a first delay request message (706) at a third time ($t_{3,1}$) in response to receiving the synchronization message (705), the first delay request message (706) comprising the third time ($t_{3,1}$); receiving, by the first node (701), the first delay request message (706) at a fourth time ($t_{4,0}$); transmitting, by the first node (701), a first delay response message at a fifth time ($t_{7,0}$) in response to receiving the first delay request message (706), the first delay response message comprising the fourth time ($t_{4,0}$); and receiving, by the second node (702), the first delay response message at a sixth time ($t_{8,1}$); and calculating, by the second node (702), a timing offset with respect to the first node based on a difference between: the second time ($t_2$) minus the first time ($t_1$); and the fourth time ($t_{4,0}$) minus the third time ($t_{3,1}$).

In an embodiment the timing offset is calculated according to $0.5 \times [(t_2 - t_1) - (t_{4,0} - t_{3,1})]$.

In an embodiment the wireless network further comprises a third node and the method comprises: receiving, by the third node (703), the first delay request message (706) at a seventh time ($t_{4,2}$); transmitting, by the third node (703), a second delay request message (707) at an eighth time ($t_{5,2}$) in response to receiving the first delay request message (706); receiving, by the second node (702), the second delay request message (707) at a ninth time ($t_{6,1}$); transmitting, by the second node (702), a second delay response message (710) at a tenth time ($t_{9,1}$) in response to receiving the second delay request message (707) and the first delay response message (709), the second delay response message (710) comprising the ninth time ($t_{6,1}$); receiving, by the third node (703), the second delay response message (710) at an eleventh time ($t_{10,2}$); and calculating, by the third node (703), a timing offset with respect to the first node (701).

In an embodiment the timing offset comprises a time offset and a rate offset.

In an embodiment the rate offset is added to the time offset to determine the total offset.

In an embodiment the method further comprises calculating the time offset based on a difference between: the seventh time ($t_{4,2}$) minus the third time ($t_{3,1}$); and the ninth time ($t_{6,1}$) minus the eighth time ($t_{5,2}$).

In an embodiment the time offset is calculated according to: $0.5 \times [(t_{4,2}-t_{3,1})-(t_{6,1}-t_{5,2})]$.

In an embodiment the first delay request message (706) comprises a residence time parameter ($RT_1$) equal to the difference between the third time ($t_{3,1}$) and the second time ($t_2$); the second delay response message (710) comprises an accumulated delay parameter ($D_{12}$) based on the propagation delay between the first node (701) and the second node (702); and calculating the rate offset comprises adding the residence time parameter ($RT_1$) to the accumulated delay parameter ($D_{12}$) and multiplying the sum by a clock rate of the second node (702) relative to the third node (703).

In an embodiment the method further comprises calculating the clock rate of the second node (702) relative to the third node (703) based on a difference between the tenth time ($t_{9,1}$) and the third time ($t_{3,1}$) relative to a difference between the eleventh time ($t_{10,2}$) and the seventh time ($t_{4,2}$).

In an embodiment the second delay response message (710) comprises a correction filed ($CF_1$) equal to the difference between the tenth time ($t_{9,1}$) and the third time ($t_{3,1}$).

In an embodiment the method further comprises time synchronizing the second node based on the timing offset.

In an embodiment time synchronizing the second node comprises updating a clock of the second node based on the timing offset, the method further comprising: generating, by the second node, a data message comprising a timestamp generated based on the clock of the second node; and transmitting the data message by the second node.

In an embodiment the method further comprises communicating, via the wireless network, an instruction message to the second node, the instruction message comprising an instruction and a timestamp indicating a time to carry out the instruction; and carrying out the instruction based on the clock of the second node.

According to a eighth aspect there is provided a method for transporting time synchronization information across a wireless network (902) according to a communication schedule, the wireless network comprising a first hybrid node (904), a second hybrid node (905), and a plurality of wireless nodes (906). The method comprising: receiving, by the first hybrid node (904), a first synchronization message (907) comprising a timestamp (O); transmitting, by the first hybrid node (904), a wireless message (908) comprising the timestamp (O); propagating, by the plurality of wireless nodes (906), the wireless message (908; 1001) across the wireless network according to the communication schedule; receiving, by the second hybrid node (905), the wireless message (908); transmitting, by the second hybrid node (905), a second synchronization message (909) comprising the timestamp (O) and a correction value ($C_i$); wherein: the communication schedule provides a fixed propagation time between the first hybrid node (904) and the second hybrid node (905); and the correction value ($C_i$) is based on the fixed propagation time.

In an embodiment the fixed propagation time is a fixed residence time in the wireless network (902) and the correction value ($C_i$).

In an embodiment the communication schedule is a multi-hop Time Division Multiple Access (TDMA) schedule.

In an embodiment the communication schedule is repeated more than once.

In an embodiment the fixed propagation time equals a maximum delay ($T_D$) for communication between two nodes in the wireless network.

In an embodiment the first synchronization message is received by the first hybrid node (904) at an ingress time ($T_{ingress}$), and the method further comprises: calculating, by the first hybrid node (904), an egress time ($T_{egress}$) at which the second hybrid node (905) is to transmit the second synchronization message (909); transmitting, by the first hybrid node (904) the egress time ($T_{egress}$) to the second hybrid node (905); and transmitting, by the second hybrid node (905), the second synchronization message (909) at the egress time ($T_{egress}$).

In an embodiment the egress time ($T_{egress}$) is greater than a sum of the ingress time ($T_{ingress}$) and the maximum delay ($T_D$).

In an embodiment the correction value ($C_i$) equals a time difference between the egress time ($T_{egress}$) and the ingress time ($T_{ingress}$).

In an embodiment the wireless message (1001) comprises the difference between the egress time ($T_{egress}$) and the ingress time ($T_{ingress}$) and the method further comprises: transmitting a second wireless message (1002) comprising the egress time ($T_{egress}$).

In an embodiment the wireless network further comprises a first system (901) and a second system (903). The method further comprising: transmitting, by the first system (901), the first synchronization message (907) comprising the timestamp (O); receiving, by the second system (903), the second synchronization message (909) and; time synchronizing the second system (903) to the first system (901).

In an embodiment the method further comprises: generating, by the second system (903), a data message comprising a timestamp generated based on a clock of the second system (903); and transmitting the data message by the second node.

In an embodiment the method further comprises communicating, via the wireless network, an instruction message to the second system (903), the instruction message comprising an instruction and a timestamp indicating a time to carry out the instruction; and carrying out the instruction based on the clock of the second system.

Figure 1:
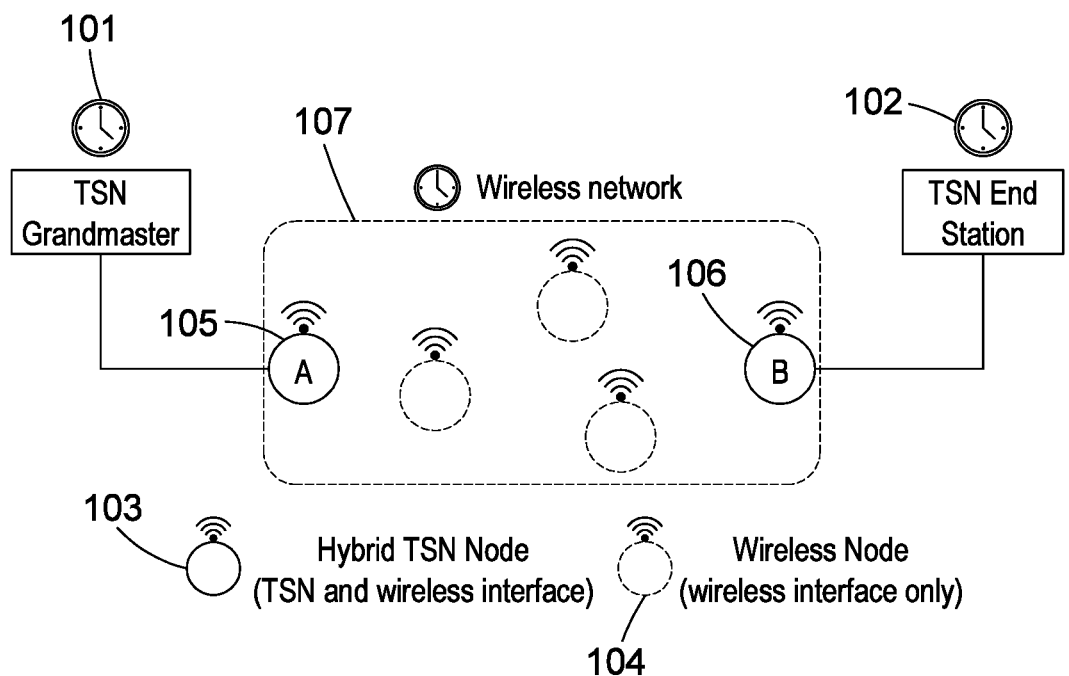
FIG. 1 shows shows a network model of a hybrid wired-wireless Time Sensitive Networking (TSN) system according to an embodiment.

FIG. 1 shows a network model of a hybrid wired-wireless Time Sensitive Networking (TSN) system according to an embodiment. FIG. 1 shows a network connecting two Time Sensitive Networking (TSN) end stations in which a Time Sensitive Networking (TSN) talker shares information, in particular timing information, with a Time Sensitive Networking (TSN) listener. The Time Sensitive Networking (TSN) end stations could take many forms including, but not limited to, controllers, sensors, actuators and robots. In FIG. 1 the Time Sensitive Networking (TSN) end stations use one or more Time Sensitive Networking (TSN) bridges to share the information over the hybrid wired-wireless network.

In FIG. 1 timing information is communicated from a Time Sensitive Networking (TSN) Grandmaster 101, which is a Time Sensitive Networking (TSN) talker, to a Time Sensitive Networking (TSN) End Station 102, which is a Time Sensitive Networking (TSN) listener. The network model in FIG. 1 comprises two different types of nodes: hybrid Time Sensitive Networking (TSN) nodes 103 and wireless nodes 104. Hybrid Time Sensitive Networking (TSN) nodes 103 have both an interface to the Time Sensitive Network and an interface to a wireless network 107, whereas wireless nodes 104 only have an interface to the wireless network 107.

In FIG. 1 a first Hybrid Time Sensitive Networking (TSN) node 105 is communicatively coupled to the Time Sensitive Networking (TSN) Grandmaster 101 either directly, or through an 802.1AS-aware Time Sensitive Networking (TSN) bridge. In FIG. 1 a second hybrid Time Sensitive Networking (TSN) node 106 is directly coupled to the Time Sensitive Networking (TSN) End Station 102. In the system of FIG. 1, the second Hybrid Time Sensitive Networking (TSN) node 106 time synchronise the Time Sensitive Networking (TSN) End Station 102 with the Time Sensitive Networking (TSN) Grandmaster 101 using information communicated over the wireless network 107.

Time synchronisation in Time Sensitive Networking (TSN) is governed by the generalized Precision Time Protocol (gPTP) of IEEE 802.1AS standard, which is included herein by reference in its entirety. Generalized precision time protocol (gPTP) is a generalisation of the Precision Time Protocol (PTP) defined by the IEEE 1588 standard.

Figure 2:
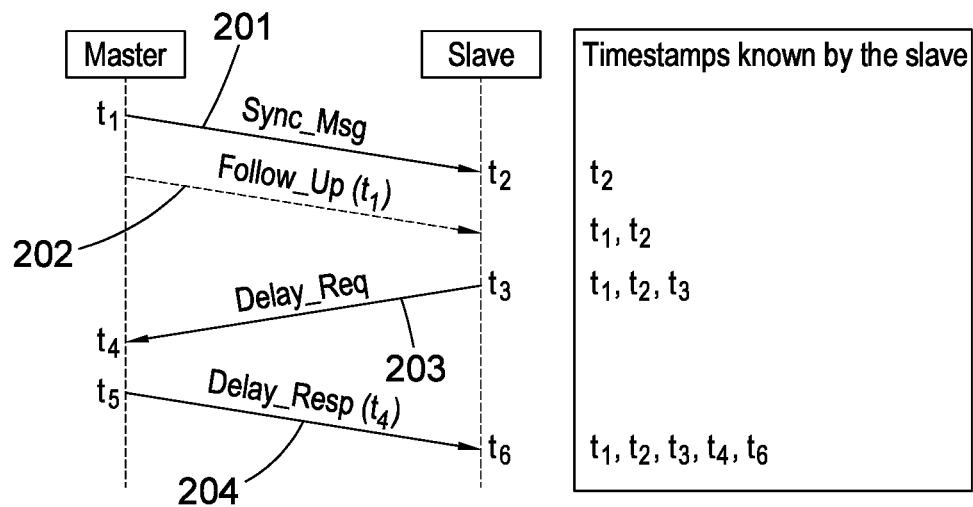
FIG. 2 shows a prior art version of Precision Time Protocol (PTP)

FIG. 2 shows a known version of Precision Time Protocol (PTP). IEEE 1588 Precision Time Protocol (PTP) is the de-facto standard for industrial time synchronisation in wired networks. In Precision Time Protocol (PTP) the master device is the provider of the time and the slave device synchronizes to the master device. The master device may be a Grandmaster (i.e. a master device that is synchronized to a time reference (e.g. a Global Positioning System (GPS) signal)). Precision Time Protocol (PTP) involves an exchange of timestamps between a master device and a slave device so that the salve device can update its local clock to synchronize with the clock of the master device.

In step 201 the master device initiates the time synchronization process by transmitting a SYNC message (Sync_Msg). The master device records a first timestamp, $t_1$, when the SYNC message is transmitted by the master and the slave device records, using its local clock (i.e. the slave clock), a second timestamp, $t_2$, when the SYNC message is received by the slave device. In step 202 the master device transmits a FOLLOW_UP message (Follow_Up($t_1$)) comprising the first timestamp $t_1$. Now the slave device has timestamps $t_1$ and $t_2$. The difference between these two timestamps represents the sum of: the clock offset of the slave device (relative to the master device) and the link delay from the master device to the slave device.

A second set of messages is subsequently exchanged to account for network delay variations. In step 203 the slave device transmits a DELAY_REQ message (Delay_Req) and records a third timestamp, $t_3$, when the message is transmitted. The master device records a fourth timestamp, $t_4$, when the DELAY_REQ message (delay_req) is received. In step 204 the master device transmits a DELAY_RESP message (Delay_Resp($t_4$)) comprising the fourth timestamp, $t_4$. The difference between the third and fourth timestamps is the slave to master link delay.

Now the slave device has timestamps $t_1$, $t_2$, $t_3$ and $t_4$. Once these timestamps have been obtained the slave device calculates a clock offset representing the offset of the slave clock with respect to the master clock. The clock offset at the slave device is calculated as follows:

Offset=$t_2$-$t_1$-Link_Delay

Where:

Link_Delay=0.5×[($t_2$-$t_1$)+($t_4$-$t_3$)]

Consequently:

$$\text{Offset} = \frac{(t2 + t3 - t1 - t4)}{2}$$

This offset can then be used to update the slave clock, thereby synchronizing the slave device and the master device in time.

Precision Time Protocol (PTP) is often used for time synchronisation in wired networks where the propagation time between the master device and the salve device, as well as the processing times at the master device and the salve device are predictable. However, this cannot be guaranteed in wireless networks.

Communications in 5G networks are often subject to scheduling delays and retransmissions, resulting in timing uncertainty (i.e. variations) at the air interface. Consequently, when Precision Time Protocol (PTP) is used in wireless networks the timing accuracy at the slave device can actually decrease.

Furthermore, in order to accurately compensate for propagation delay at the physical layer, Precision Time Protocol (PTP) requires a communication link that is approximately symmetrical (i.e. has the same properties irrespective of the direction of communication). This cannot be guaranteed in wireless systems as the uplink and downlink could have different characteristics (e.g. propagation delays). Finally, in wireless networks the master and slave clocks drift independently. As a result, periodic offset and delay correction is required in order to maintain clock synchronization.

802.11AS is an adaptation of Precision Time Protocol (PTP) for use in Time Sensitive Networking (TSN) and provides a mechanism to transport time synchronization information over multiple time-aware wired systems.

Figure 3:
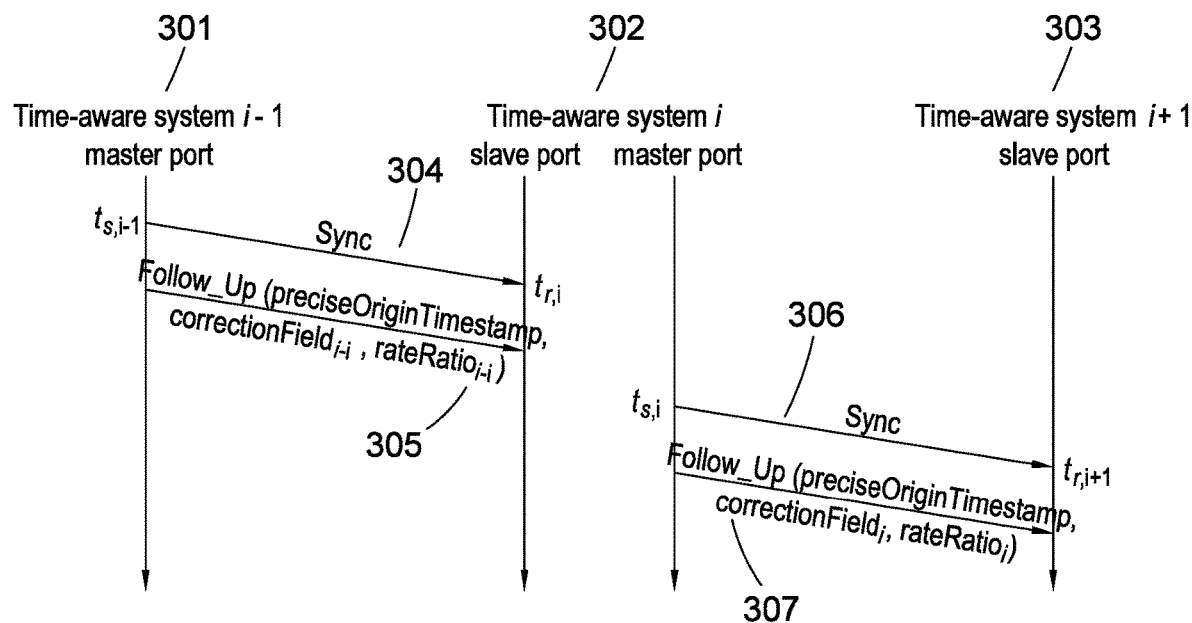
FIG. 3 shows a known method of transporting time synchronization information in a wired system.

FIG. 3 shows a known method of transporting time synchronization information in a wired system. FIG. 3 shows the transportation of time synchronization between a first time-aware system 301 (index i−1), a second time-aware system 302 (index i), and a third time-aware system 303 (index i+1). In FIG. 3 synchronization information is transported from the first time-aware system 301 to the second time-aware system 302 and then to the third time-aware system 303.

The transportation of time synchronization information begins by the first time-aware system 301 transmitting a SYNC message 304 to the second time-aware system 302 at time $t_{s,i-1}$ (measured relative to the local clock of the first time-aware system 301). The first time-aware system 301 subsequently transmits an associated FOLLOW_UP message 305 to the second time-aware system 302 comprising a precise origin timestamp (preciseOriginTimestamp), a correction field (correctionField$_{i-1}$), and a rate ratio (rateRatio$_{i-1}$).

The precise origin timestamp field (preciseOriginTimestamp) contains the time at the TSM Grand master when the grand master originally sent the timing synchronisation information. As will be noted from FIG. 3, this field of the FOLLOW_UP message is not indexed since the value of the precise origin timestamp field (preciseOriginTimestamp) does not normally change as the SYNC and FOLLOW_UP messages traverse the network. The correction field (correctionField$_{i-1}$) comprises the difference between the precise origin timestamp (preciseOriginTimestamp) and the synchronized time when the SYNC message is sent (i.e. the Grand Master time corresponding to the local time, $t_{s,i-1}$). In this case, the sum of the precise origin timestamp (preciseOriginTimestamp) and the correction field (correctionField$_{i-1}$) gives the synchronized time (i.e. the time at the Grand Master clock) corresponding to the local time $t_{s,i-1}$ when the SYNC message 304 was transmitted. The rate ratio (rateRatio$_{i-1}$) field indicates the ratio of the grandmaster clock frequency to the frequency of the local clock at the first time-aware system 301 (index i−1).

The second time-aware system 302 (index i) receives the SYNC message 304 at time $t_{r,i}$ (where r corresponds to receipt of a SYNC message at the $i^{th}$ time-aware system) relative to its local clock (i.e. the local clock at the second-time aware system 302). The second time-aware system 302 generates a timestamp at time $t_{r,i}$ upon receipt of the SYNC message 304. The second time-aware system 302 subsequently receives the FOLLOW_UP message 305 transmitted by the first time-aware system 301.

The second time-aware system 302 subsequently transmits a further SYNC message 306 to the third time-aware system 303. The second time-aware system 302 transmits the further SYNC message 306 at time $t_{s,i}$ (where s corresponds to the transmission of a SYNC message and i indicates that the transmission is from the $i^{th}$ time-aware system) measured relative to the local time at the second time-aware system 302.

The second time-aware system 302 subsequently transmits a further FOLLOW_UP message 307. The further FOLLOW_UP message 307 has an updated correction field (correctionField$_i$) and an updated rate ratio field (rateRatio$_i$). In order to compute an updated correction field (i.e. correctionField$_i$) the second time-aware system 302 has to compute the time difference between transmitting the further SYNC message 306 (i.e. $t_{s,i}$) and the precise origin timestamp (preciseOriginTimestamp).

To do this, the second time-aware system 302 computes the value of the time interval between the transmission time of the SYNC message 304 (i.e. $t_{s,i-1}$) and the transmission time of the further SYNC message 306 (i.e. $t_{s,i}$), expressed in the grand master time base. This time interval is equal to the sum of: 1) The propagation delay between the first time-aware system 301 (index i−1) and the second time-aware system 302 (index i) expressed in the grandmaster time base; and 2) the residence time at the second time-aware system 302 (i.e. the difference between the time the SYNC message was transmitted by the second time-aware system 302 (i.e. $t_{s,i}$) and the time the SYNC message was received at the second time-aware system 302 (i.e. $t_{r,i}$)); all expressed in the grandmaster time base.

Upon receiving the further FOLLOW_UP message 307, the third time-aware system 303 synchronizes its local clock based on the values of the precise origin timestamp (preciseOriginTimestamp) and the correction field (correctionField$_j$).

Figure 4:
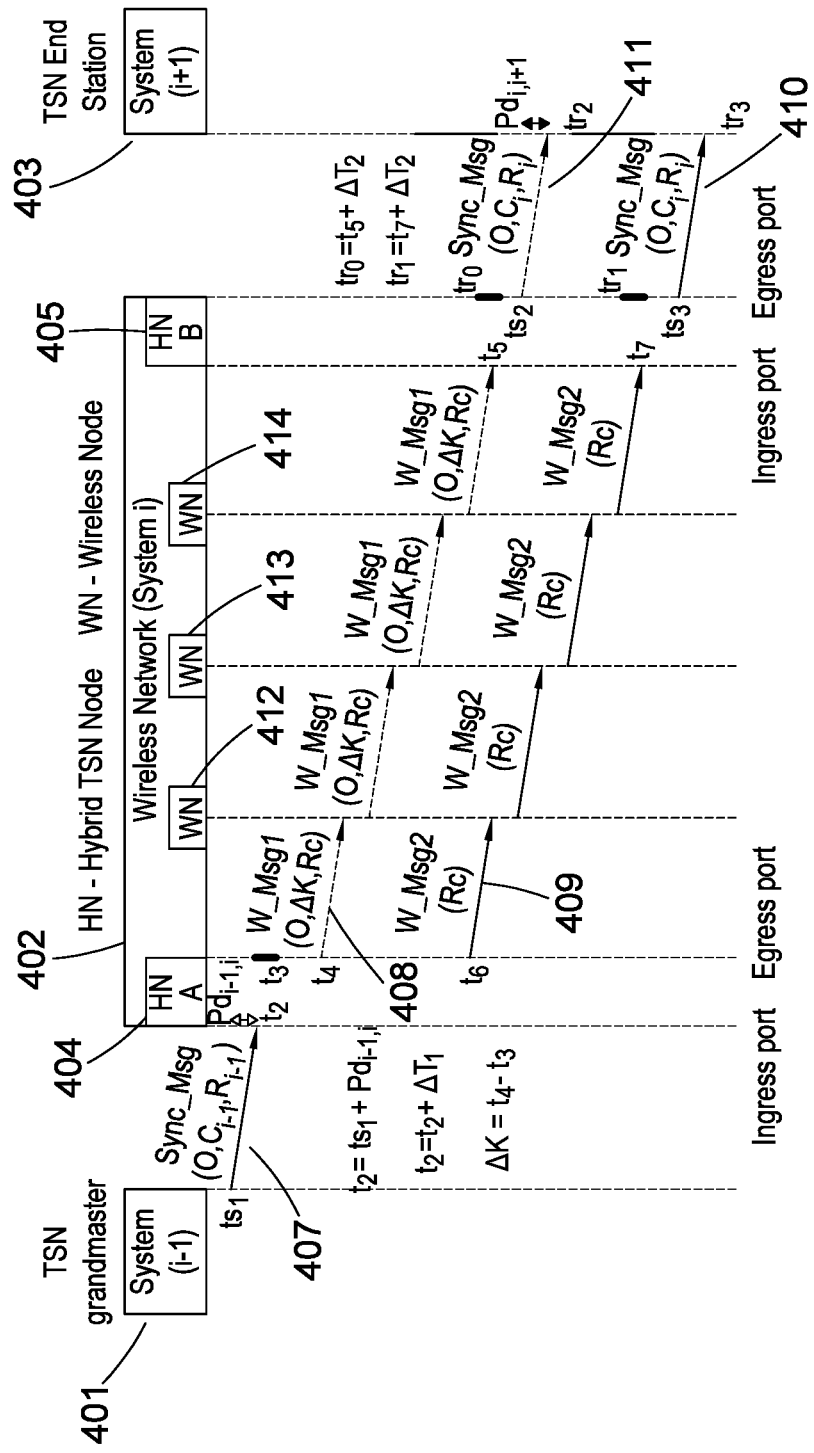
FIG. 4 shows a method of transporting time synchronization information in an integrated wired-wireless Time Sensitive Network (TSN) system according to an embodiment.

FIG. 4 shows a method of transporting time synchronization information in an integrated wired-wireless Time Sensitive Network (TSN) system according to an embodiment. In particular, FIG. 4 provides a boundary clock solution for the transportation of time synchronization information (specifically the TSN grand master time) over a multi-hop wireless network. As known in the art, a boundary clock is a timing device that may be a slave to a master device on one port whilst acting as a master device to other slave devices on another port. As will be discussed in more detail below, the boundary clocks are in the form of hybrid Time Sensitive Network (TSN) nodes.

The integrated wired-wireless Time Sensitive Network (TSN) system comprises a first system 401 (index i−1) representing the Time Sensitive Network (TSN) grandmaster, a wireless network 402 (index i), and a second system 403 (index i+1) representing the Time Sensitive Network (TSN) end station. The wireless network 402 comprises a first hybrid TSN node 404, a second hybrid TSN node 405, a first hop wireless node 412, a second hop wireless node 413 and a third hop wireless node 414.

In FIG. 4 the first hybrid TSN node 404 comprises an ingress port to communicate with the first system 401 (index i−1) and an egress port to communicate with the plurality of wireless nodes in the wireless network 402 (index i). The first system 401 is either: a TSN Grand Master, or a system that is synchronized to the TSN grandmaster (e.g. by using generic Precision Time Protocol (PTP) as described in IEEE 802.1AS). In this way the first hybrid TSN node 404 has direct access to the Time Sensitive Networking (TSN) Grand Master time. In FIG. 4 the ingress port of the first hybrid TSN node 404 uses the TSN time base and the egress port of the first hybrid TSN node 404 uses the time base of the wireless network (i.e. the wireless time base).

In FIG. 4, the second hybrid TSN node 405 comprises an ingress port for communication with the plurality of wireless nodes in the wireless network 402, and an egress port to communicate with the second system 403 (index i+1), which represents the TSN end station. In FIG. 4 the second system 403 (i.e. the TSN end station) is time synchronized with the second hybrid TSN node 405, optionally by using generic Precision Time Protocol (PTP) as described in IEEE 802.1AS. In FIG. 4 the ingress port of the second hybrid TSN node 405 uses the wireless time base and the egress port of the second hybrid TSN node 405 uses the TSN time base.

The method of time synchronization show in FIG. 4 will now be discussed in further detail.

At a first time, $ts_1$, the first system 401 transmits a first SYNC message (SYNC_MSG) 407.

Each SYNC message comprises a precise origin timestamp field, O, a correction field, C, and a rate ratio field, R. As discussed above, the precise origin timestamp field (preciseOriginTimestamp) indicates the time at the TSM Grandmaster when the grandmaster originally sent the timing synchronisation information, the correction field (correctionField) indicates the difference between the precise origin timestamp and synchronized time (i.e. the time at the grand master clock) when the SYNC message was transmitted, and the rate ratio (rateRatio) field indicates the ratio of the grandmaster clock frequency to the frequency of the local clock at the time-aware system transmitting the SYNC message.

The first SYNC message (SYNC_MSG) 407 transmitted by the first system 401 (index i−1) comprises a correction field value calculated by the first system 401, $C_{i-1}$, and a rate ratio calculated by the first system 401, $R_{i-1}$. If the first system 401 is directly connected to the TSN grandmaster, then the precise origin timestamp field, O, equals the time of transmission of the first SYNC message (SYNC_MSG) 407, i.e. O=$ts_1$ and $C_{i-1}$=0.

The first hybrid TSN node 404 subsequently receives the first SYNC message (SYNC_MSG) 407 from the first system 401 at its ingress port. The first hybrid TSN node 404 then calculates the grandmaster time corresponding to the local time when the first SYNC message (SYNC_MSG) 407 was received by the first hybrid TSN node 404 i.e. $t_2$. The first hybrid TSN node 404 calculates $t_2$ by adding the path delay (i.e. the propagation delay) between the first system 401 and the first hybrid TSN node 404, $Pd_{i-1,i}$, to the time of transmission of the first SYNC message 407, $ts_1$ (i.e.

$t_2=ts_1+Pd_{i-1,i}$). Where the time of time of transmission of the first SYNC message 407, $ts_1$, in grand master time base is calculated by adding the precise origin timestamp field (preciseOriginTimestamp) to the correction field (correctionField).

The first hybrid TSN node 404 subsequently determines the equivalent time value of $t_2$ in the wireless time base (i.e. the timing clock used by the wireless network 402). This time value is denoted by the symbol $t_3$. This time value is calculated according to $t_3=t_2+\Delta T_1$ where $\Delta T_1$ denotes the time difference between the Time Sensitive Networking (TSN) time base and the wireless time base at the first hybrid TSN node 404.

The wireless network 402 may or may not be time synchronized (internally). As a result, the method shown in FIG. 4 facilitates the transportation of TSN time synchronization information, and therefore the synchronisation of two TSN stations, in both scenarios. In an embodiment, the wireless network 402 is time synchronized through the exchange of non-IEEE 802.11AS time synchronization messages.

After receiving the first SYNC message (SYNC_MSG) 407, the first hybrid TSN node 404 transmits a first time synchronization message (W_MSG1) 408, at time $t_4$, from the node's egress port. The first time synchronization message (W_MSG1) 408 comprises the precise origin timestamp, O, transmitted in the first SYNC message (SYNC_MSG) 407, as well as an offset parameter, $\Delta K$, and a relay counter parameter, Rc. The offset parameter, $\Delta K$, represents the residence time in the first hybrid TSN node 404. The residence time at the first hybrid TSN node 404 is equal to the time difference, in the wireless time base, between receiving the first SYNC message (SYNC_MSG) 407, $t_3$, and transmitting the first time synchronization message (W_MSG1) 408, $t_4$ (i.e. $\Delta K=t_4-t_3$). The relay counter parameter, Rc, is incremented at each hop in the multi-hop communication path in order to facilitate time synchronization as will be discussed in more detail below.

The first time synchronization message (W_MSG1) 408 propagates across the wireless network 402, between the wireless nodes 406 until it is received at an ingress port of the second hybrid TSN node 405. In FIG. 4 the first time synchronization message (W_MSG1) 408 is received by the second hybrid TSN node 405 at a fifth time, $t_5$.

Based on the first time synchronization message (W_MSG1) 408, the second hybrid TSN node 405 time synchronizes to the fourth time, $t_4$, which is the reference time for synchronization of the multi-hop wireless network 402.

After receiving the first time synchronization message (W_MSG1) 408, the second hybrid TSN node 405 determines the TSN grandmaster time corresponding to the fifth time, $t_5$, (which is measured in the time base of the wireless network 402). The equivalent of the fifth time, $t_5$, in TSN time base is denoted by $tr_0$. The equivalent of the fifth time in TSN time base, i.e. $tr_0$, is calculated by adding a time difference, $\Delta T_2$, equalling the difference between the wireless network time base and the TSN time base at the second hybrid TSN node 405, to the fifth time, $t_5$ (i.e. $tr_0=t_5+\Delta T_2$).

As will be apparent from the description below, it is possible to time synchronize the second system 403 (i.e. the TSN end station) with the first system 401 (i.e. the TSN grandmaster) using a single time synchronization message (e.g. W_MSG1). However, when only a single time synchronization message is used there is no information concerning the rate ratio parameter, $R_i$, in the synchronization message to the second system 403, thereby leading to an incomplete time synchronization.

In light of this, the method shown in FIG. 4 utilises a second time synchronization message (W_MSG2) 409. The second time synchronization message (W_MSG2) 409 comprises the relay counter parameter, Rc. Optionally, the second time synchronization message (W_MSG2) 409 only contains the relay counter parameter, Rc.

The first hybrid TSN node 404 transmits the second time synchronization message (W_MSG2) 409 at a sixth time, $t_6$, via its egress port. The sixth time, $t_6$ being after the fourth time, $t_4$. The second time synchronization message (W_MSG2) 409 subsequently propagates across the wireless network 402, between the wireless nodes, until it is received at the ingress port of the second hybrid TSN node 405. The second time synchronization message (W_MSG2) 409 is received at the ingress port of the second hybrid TSN node 405 at a seventh time, $t_7$. As will be discussed in more detail below, based on the value of the relay counter parameter, Rc, the second hybrid TSN node 405 calculates the sixth time, $t_6$ (i.e. the time of transmission of the second time synchronization message (W_MSG2) 409).

After receiving the second time synchronization message (W_MSG2) 409 at the seventh time, $t_7$, the second hybrid TSN node 405 calculates the equivalent time in the TSN time base, denoted by $tr_1$, when the wireless network time was $t_7$. The second hybrid TSN node 405 calculates the equivalent time in the TSN time base, i.e. $tr_1$, by adding the time difference, $\Delta T_2$, between the wireless network time base and the TSN time base at the second hybrid TSN node 405 to the seventh time, $t_7$ (i.e. $tr_1=t_7+\Delta T_2$).

After receiving the second time synchronization message (W_MSG2) 409 the second hybrid TSN node 405 transmits a second synchronization (SYNC) message 410, via its egress port, to the second system 403 (i.e. the TSN end station). The second hybrid TSN node 405 transmits the second synchronization (SYNC) message 410 at time $ts_3$, measured in the TSN time base. The second synchronization (SYNC) message 410 comprises a correction field parameter calculated by the $i^{th}$ system, $C_i$, according to: $C_i=ts_3-t_3$.

The second synchronization (SYNC) message 410 also comprises a rate ratio parameter calculated by the $i^{th}$ system, $R_i$, according to: $R_i=(t_6-t_4)/(t_7-t_5)$. The second hybrid TSN node 405 is aware of local timings $t_5$ and $t_7$, and, as will be discussed below, based on these times, knowledge of the communication scheduling (e.g. slot times and guard times) and the hop count from first hybrid TSN node 404, it is possible to calculate times $t_6$ and $t_4$.

The second system 403 receives the second synchronization (SYNC) message 410 and synchronizes with the TSN grandmaster at time $tr_3$, which is given by:

$$tr_3=O+Pd_{i,i+1}+C_i \times R_i,$$

where:
O is the precise origin timestamp of the TSN grandmaster;
$Pd_{i,i+1}$ is the path delay (i.e. the propagation delay) between the second hybrid TSN node 405, which is part of the wireless network 402 (index i) and the second system TSN system 403 (index i+1);
$C_i$ is the correction field parameter calculated by the second hybrid TSN node 405; and
$R_i$ is the rate ratio parameter calculated by the second hybrid TSN node.

In the case where the first system 401 is not the TSN grandmaster itself, the second hybrid TSN node 405 calculates the rate ratio parameter $R_i$, by accumulating rate ratios based on the first system 401 and the wireless network 402.

There are various ways to accumulate rate ratios. In one approach rate ratios of neighbouring nodes are added together to generate an accumulated rate ratio. For example, in a network comprising a TSN grand master and a first system, where the first system's clock is 60 parts per million (PPM) slower than the TSN grandmaster, the rate ratio of the first system to the TSN grand master is equal to 1-60 PPM. If a second system, connected to the first system, has a clock that runs 10 parts per million (PPM) slower than the first system's clock, then the accumulated rate ratio is 1-60 PPM-10 PPM=1-70 PPM. Of course if a system's clock runs faster than a neighbouring clock, the difference would be added rather than subtracted. In an embodiment where the rate ratios are accumulated the rate ratio calculated by the first system $401$, $R_{i-1}$, and received by the first hybrid TSN node $404$ is transmitted in any one of: the first time synchronization message (W_MSG1) $408$, the second time synchronization message (W_MSG2) $409$, or a separate communication message.

Optionally, the second hybrid TSN node $405$ transmits a further synchronization (SYNC) message $411$ at time $ts_2$, in response to receiving the first time synchronization message (W_MSG1). In keeping with other synchronization messages, the further synchronization (SYNC) message $411$ comprises the precise origin timestamp, O, a correction field parameter calculated for the wireless network $402$, $C_i$, and a rate ratio parameter, $R_i$. The correction field parameter is calculated according to: $C_i=ts_2-t_3$. However, because there is no second synchronization message, there is no way to calculate differences in rate between the first hybrid TSN node $404$ and the second hybrid TSN node $406$. As a result, the rate ratio parameter, $R_i$, cannot be calculated. In this case the rate ratio field is set to one.

In a further embodiment, the first time synchronization message (W_MSG1) $408$ and the second time synchronization message (W_MSG2) $409$ are periodically transmitted in order to mitigate the effect of clock drift. The periodicity of the first and second time synchronization messages are determined by the transmission rate of first SYNC message (SYNC_MSG) $407$ from the first hybrid TSN $401$. In an embodiment the transmission rate of first SYNC message (SYNC_MSG) $407$ from the first hybrid TSN is determined by the drift rate of the clocks in the first system $401$.

In both the above cases, in order to calculate a value for the correction field parameter, $C_i$, it is necessary to know the time $t_3$ when the first SYNC message (SYNC_MSG) $407$ was received at the first hybrid TSN node $404$. The first time synchronization message (W_MSG1) $408$ comprises an offset parameter, $\Delta K$, that represents the residence time in the first hybrid TSN node $404$ (i.e. $\Delta K=t_4-t_3$). Consequently, if the time of transmission of the first time synchronization message (W_MSG1) $408$, ta, is known it is possible, based on the contents of the first time synchronization message (W_MSG1) $408$ to determine the time $t_3$. The time of transmission of the first time synchronization message (W_MSG1) $408$, $t_4$, can be determined using the relay counter present in the first and second time synchronization messages (W_MSG1 and W_MSG2), and knowledge of the scheduling using to communicate messages across the multi-hop wireless network.

There are two methods by which time synchronization information can be transported over the multi-hop wireless network $402$ shown in FIG. 4.

In a first approach time synchronization information is transported across the wireless network $402$ by using a multi-hop Time Divisional Multiple Access (TDMA) schedule as shown in FIG. 5.

FIG. 5 shows a Time Division Multiple Access (TDMA) schedule for communicating time synchronization information across a multi-hop wireless network according to an embodiment. FIG. 5 shows a Time Division Multiple Access (TDMA) schedule $500$ where each hop of the network has a dedicated timeslot for communication. Optionally, the Time Division Multiple Access (TDMA) schedule is built using the centralized or decentralized schedule generation techniques of GALLOP as described in US 2018-0302908 A1, which is incorporated herein by reference.

In the schedule of FIG. 5 the first hybrid TSN node $404$ transmits a time synchronization message (e.g. W_MSG1 or W_MSG2) to the first hop wireless node $412$ in a first timeslot $501$. The time synchronization message (e.g. W_MSG1 or W_MSG2) transmitted in the first timeslot $501$ has the relay counter parameter, Rc, set to 0. The time synchronization message (e.g. W_MSG1 or W_MSG2) is received by the first hop wireless node $512$, and is subsequently transmitted to the second hop wireless node $413$ in a second timeslot $502$. Before transmitting the time synchronization message (e.g. W_MSG1 or W_MSG2), the first hop wireless node $412$ increments the relay counter parameter, Rc. In the example of FIG. 5, the first hop wireless node $412$ increments the relay counter parameter by one, from zero to one. The time synchronization message (e.g. W_MSG1 or W_MSG2) is then transmitted to the third wireless hope node $415$ in a third timeslot $503$, incrementing the relay counter parameter, Rc, accordingly. The time synchronization message (e.g. W_MSG1 or W_MSG2) continues propagating in a hop-by-hop manner until the time synchronization message is received by the second hybrid TSN node $405$. In the schedule of FIG. 5 each timeslot (e.g. $501$, $502$ and $503$) has a fixed length or time duration equal to $T_{slot}$ and each adjacent timeslot is separated in time by a constant guard interval, $T_{guard}$.

Upon receiving the time synchronization message, the second hybrid TSN node $405$ computes a reference time, $T_{ref}$. The reference time, $T_{ref}$, is the time of transmission of the time synchronization message (e.g. W_MSG1 or W_MSG2) by the first hybrid TSN node $404$. In the example of FIG. 4 the reference time, $T_{ref}$, corresponds to the fourth time, $t_4$, when the time synchronization message is the first time synchronization message $408$; while $T_{ref}$ corresponds to the sixth time, $t_6$, when the time synchronization message is the second time synchronization message $409$. The second hybrid TSN node $405$ calculates the reference time according to: $T_{ref}=(Rc+1)\times T_{slot}+(Rc\times T_{guard})$.

As will be appreciated from the above, the scheduling shown in FIG. 5 requires the nodes to be time synchronized with each other.

In a second approach time synchronization information is transported across the wireless network $402$ by using a flooding-based technique as shown in FIG. 6.

FIG. 6 shows a flooding-based technique for communicating time synchronization information across a multi-hop wireless network according to an embodiment. FIG. 6 shows a flooding-based technique that does not require the wireless network to be time synchronized. The flooding-based technique, referred to as "Glossy", exploits synchronous transmissions and essentially works by each node relaying overhead messages immediately after receiving them. The flooding process of FIG. 6 is driven by radio events. For example, a message transmission by a node is triggered in response to receiving the message at the node.

The flooding-based technique shown in FIG. 6 begins with the first hybrid TSN node $404$ initiating the flood by transmitting a time synchronization message (e.g. W_MSG1 or W_MSG2) with the relay counter parameter, Rc, set to zero. The subsequent transmission of the time synchronization message (e.g. W_MSG1 or W_MSG2) is driven by radio events. Upon receiving the time synchronization message (e.g. W_MSG1 or W_MSG2) from the first hybrid TSN node 404, the first hop wireless node 412 increments the relay counter parameter, Rc, in this case setting the relay counter parameter to 1, and then transmits the updated time synchronization message. The time synchronization message (e.g. W_MSG1 or W_MSG2) propagates throughout the wireless network 402 on a hop-by-hop basis by receiving the time synchronisation message, incrementing the relay counter, and subsequently transmitting the updated time synchronization message.

Since the relay counter parameter, Rc, is incremented during each hop of the wireless network, it is possible for any node to infer how many times the received message has been relayed (i.e. the distance in hops to the first hybrid TSN node 404). In the flooding-based communication method of FIG. 6 the size of the time synchronization message is fixed even though the value of the relay counter parameter is updated during each hop, this is because the relay counter field has a fixed size which is greater than or equal to a predetermined number of hops that are required to traverse the wireless network. That is to say that the size of the time synchronization message is not altered between hops. As a result, the time between two successive transmissions of a message is a network-wide constant, which is denoted by $T_{slot}$ in FIG. 6.

In FIG. 6 each node (e.g. 404, 412, 413, and 414) transmits a message for a predetermined maximum number of NTx times. In FIG. 6 the maximum number of transmissions for each node is 2 (i.e. NTx=2). For example, the first hybrid TSN node 404 first transmits the time synchronization message (e.g. W_MSG1 or W_MSG2) to initiate the flooding at a first time instant 601. After receiving the time synchronization message transmitted by the first hybrid TSN node 404, the first hop wireless node 412 increments the value of the relay counter, Rc, and transmits the updated time synchronization message at a second time instant 602. The updated time synchronization message is received by the first hybrid TSN node 404 at the second time instant 602. In response to receiving the time synchronization message at time instant 602, the first hybrid TSN node 404 increments the value of the relay counter, Rc, and transmits a time synchronization message for the second time at time instant 603. This is received by the first hop wireless node 412, which then increments the hop counter and transmits a time synchronization message for the second time at time instant 604. The first hybrid TSN node 404 receives the second time synchronization message from the first hop wireless node 412 at time instant 604. However, because the first hybrid TSN node 404 has already transmitted a number of synchronization messages equal to the maximum number of transmissions (i.e. two in FIG. 6), no further transmissions by the hybrid TSN node 404 are triggered.

Upon reception of a time synchronization message the second hybrid TSN node 405 computes a reference time, $T_{ref}$ that corresponds to the time of transmission of the time synchronization message (e.g. W_MSG1 or W_MSG2) by the first hybrid TSN node 404. In the example of FIG. 4 the reference time, $T_{ref}$, corresponds to the fourth time, ta, when the time synchronization message is the first time synchronization message 408; while $T_{ref}$, corresponds to the sixth time, $t_6$, when the time synchronization message is the second time synchronization message 409. In the embodiment of FIG. 6, the second hybrid TSN node 405 calculates the reference time according to: $T_{ref}=(Rc+1)\times T_{slot}$.

In this way, by using knowledge of the communication protocol it is possible to determine the required quantities, at the second hybrid TSN node 405 to determine a value for the correction field, $C_i$, thereby enabling the TSN end station to synchronize with the TSN grand master.

In a different approach to time synchronization a system and method is provided which uses a transparent clock solution for time synchronization of an integrated wired-wireless. As known in the art, a boundary clock is a clock node that has two or more ports. A first port in a slave state for obtaining timing information from a master clock, and a second port in a master state for disseminating time to all downstream slave nodes. In comparison, transparent clocks operate by using hardware timestamps whenever a synchronization message arrives at, or departs from, the transparent clock. These hardware timestamps are then used to update the fields (e.g. the correction filed) associated with the synchronization message.

FIG. 7 shows an exchange of messages exchanged during timing synchronization across a wireless network comprising transparent clocks according to an embodiment. In FIG. 7 time synchronization is achieved by transporting PTP-like messages containing timestamps over a multi-hop wireless network. The method of time synchronization shown in FIG. 7 is discussed with reference to a system comprising a first hybrid TSN node 701, a first wireless node 702, a second wireless node 703, and a second hybrid TSN node 704. Unlike the method described in relation to FIG. 4, in FIG. 7, the first and second hybrid TSN nodes 701 & 704 are configured as a transparent clocks (as opposed to boundary clocks). The example shown in FIG. 7 shows a three-hop wireless network, however for the avoidance of doubt it is noted that the path between the first and the second hybrid TSN nodes may contain any number of hops.

In the embodiment of FIG. 7 time synchronization is achieved by exchanging three different types of message. The first type of message is a wireless synchronization (W-Sync) message comprising a timestamp when the message was transmitted, t, and a hop count, Hc.

The second type of message is a wireless delay request (W-Dreq) message comprising a timestamp when the message was transmitted, t, a hop count, Hc, and a reception-transmission (RT) parameter indicating the time difference between receiving a message (e.g. either a wireless synchronization (W-Sync) message or a wireless delay request (W-Dreq) message) and subsequent transmission of the wireless delay request (W-Dreg) message.

The third type of message is a wireless delay response (W-Dresp) message. Each delay response (W-Dresp) message comprises a timestamp corresponding to the time at which the node received a delay request (W-Dreq) message from the next hop node, a correction factor, CF, for computing the rate offset, and an accumulated propagation delay up to the previous node, D.

Time synchronization begins by the first hybrid TSN node 701 transmitting a first wireless synchronization (W-Sync) message 705 at a first time $t_1$. The timestamp field of the first wireless synchronization (W-Sync) message 705 is set equal to $t_1$ (i.e. the time of transmission) and the hop count, Hc, field of the first wireless synchronization (W-Sync) message 705 is set equal to zero.

The first wireless node 702 generates a timestamp, based on its local clock, when the first wireless synchronization (W-Sync) message 705 is received. In FIG. 7 the first wireless synchronization (W-Sync) message 705 is received by the first wireless node 702 at a second time, $t_2$.

In response to receiving the first wireless synchronization (W-Sync) message 705, the first wireless node 702 transits a first wireless delay request (W-Dreq) message 706 at a third time, $t_{3,1}$. The first wireless delay request (W-Dreq) message 706 comprises a timestamp indicating the time of transmission (i.e. $t_{3,1}$). The first wireless node 702 also increments the value of the hop count received in the first wireless synchronization (W-Sync) message 705 and includes the incremented hop count, Hc, in the first wireless delay request (W-Dreq) message 706. The first wireless node 702 also calculates a first value for the reception-transmission (RT) parameter, $RT_1$, according to the time difference between reception of the first wireless synchronization (W-Sync) message 705 and (expected) transmission of the first wireless delay request (W-Dreq) message 706 (i.e. $t_2-t_{3,1}$). This first reception-transmission (RT) parameter, $RT_1$, is also included in the first wireless delay request (W-Dreq) message 706 transmitted by the first wireless node 702.

The first wireless delay request (W-Dreq) message 706 serves two purposes in the embodiment of FIG. 7. Firstly, the wireless delay request (W-Dreq) message acts as a synchronization message for the second wireless node 703 (i.e. the next node in the multi-hop path), and secondly it triggers a delay measurement procedure with the previous node in the multi-hop path (which, in this case, is the first hybrid TSN node 701).

The first wireless delay request (W-Dreq) message 706 is received at the first hybrid TSN node 701 at time $t_{4,0}$ and is received at the second wireless node 703 at time $t_{4,2}$. Both the first hybrid TSN node 701 and the second wireless node 703 generate a timestamp when the first wireless delay request (W-Dreq) message 706 is received (corresponding to times $t_{4,0}$ and $t_{4,2}$) respectively.

In response to receiving the first wireless delay request (W-Dreq) message 706, the second wireless node 703 transmits a second wireless delay request (W-Dreq) message 707 at time $t_{5,2}$. Before transmitting the second wireless delay request (W-Dreq) message the second wireless node 703 calculates a second reception-transmission (RT) parameter, $RT_2$, equalling the time difference between transmitting the second wireless delay request (W-Dreq) message 707 and receiving the first wireless delay request (W-Dreg) message 706 (i.e. $t_{5,2}-t_{4,2}$).

The second wireless node 703 also generates an updated hop count, Hc, by incrementing the hop count received in the first wireless delay request (W-Dreq) message 706 by one. The second wireless node 703 subsequently transmits the second wireless delay request (W-Dreq) message 706 at time $t_{5,2}$. The second wireless delay request (W-Dreq) message 707 comprises the calculated second reception-transmission (RT) parameter, $RT_2$, the incremented hop count, Hc, and the time of transmission of the second wireless delay request (W-Dreq) message 707 (i.e. $t_{5,2}$).

The second wireless delay request (W-Dreq) message 707 is received at the first wireless node 702 at time $t_{6,1}$ and is received at the second hybrid TSN node 704 at time $t_{6,3}$. Both the first wireless node 702 and the second hybrid TSN node 704 generate a timestamp upon receipt of the second wireless delay request (W-Dreq) message 706 (i.e. at times $t_{6,1}$ and $t_{6,3}$ respectively).

In response to receiving the second wireless delay request (W-Dreq) message 706 the second hybrid TSN node 704 transmits a third wireless delay request (W-Dreq) message 708. Before transmitting the third wireless delay request (W-Dreq) message 708 the second hybrid TSN node 704 calculates a third reception-transmission (RT) parameter, $RT_3$, equalling the time difference between transmitting the third wireless delay request (W-Dreq) message 708 and receiving the second wireless delay request (W-Dreq) message 707 (i.e. $t_{7,3}-t_{6,3}$).

The second hybrid TSN node 704 also generates an updated hop count, Hc, by incrementing the hop count received in the second wireless delay request (W-Dreq) message 707 by one. The second hybrid TSN node 704 subsequently transmits the third wireless delay request (W-Dreq) message 708 at time $t_{7,3}$. The third wireless delay request (W-Dreq) message 708 comprises the calculated third reception-transmission (RT) parameter, $RT_3$, the incremented hop count, Hc, and the time of transmission of the third wireless delay request (W-Dreq) message 708 (i.e. $t_{7,3}$). The third wireless delay request (W-Dreq) message 708 is received by the second wireless node 703 at time $t_{8,2}$.

Each of the nodes (e.g. the hybrid TSN nodes and the wireless nodes) are able to identify when the delay request (W-Dreq) message originated from the next hop node (i.e. a node further away in hops from the first hybrid TSN node 701 than the present node) by determining whether the value of the hop count, Hc, in the received message is one greater than the hop count of the node in question.

In the method of FIG. 7 a delay measurement procedure is initiated by each of the nodes in response to receiving a wireless delay request (W-Dreq) message from the next hop node. In order to compute a timing offset between a first node and a second node, the second node requires an accumulated link delay between the second node and the first node. Furthermore, in order to ensure accurate time synchronisation it is necessary to account for the differences in clock rates at each of the nodes throughout the multi-hop network (because these clock offsets will affect the accuracy of the timing values between which the delays are calculated).

To this end, a delay response (W-Dresp) message is used to communicate the delays and rate offset corrections required for accurate time synchronization.

Each delay response (W-Dresp) message comprises a timestamp corresponding to the time at which the node received a delay request (W-Dreq) message from the next hop node, a correction factor, CF, for computing the rate offset, and an accumulated propagation delay up to the previous node, D.

As discussed above, at time $t_{4,0}$ the first hybrid TSN node 701 receives the first wireless delay request (W-Dreq) message 706 from the first wireless node 702. The first wireless delay request (W-Dreq) message 706 comprises a hop count equal to 1, this is greater than the hop count of the first hybrid TSN node, which is 0. As a result, the first hybrid TSN node 701 initiates the delay measurement procedure. After receiving the first wireless delay request (W-Dreq) message 706, the first hybrid TSN node 701 transmits a first wireless delay response (W-Dresp) message 709 at time $t_{7,0}$ comprising the timestamp when the first wireless delay request (W-Dreq) message 706 was received at the first hybrid TSN node 701 (i.e. $t_{4,0}$).

The first wireless delay response (W-Dresp) message 709 also comprises a correction factor, $CF_0$, for computing the rate offset. The correction factor indicates the time difference between two successive transmissions from the node. In this case the two successive transmissions at the first hybrid TSN node 701 being the first wireless synchronization (W-Sync) message 705 at time $t_1$ and the first wireless delay response (W-Dresp) message 709 at time $t_{7,0}$. Consequently, the correction factor, $CF_0$, for the first wireless delay response (W-Dresp) message 709 is given by $t_{7,0} - t_1$ (i.e. $CF_0 = t_{7,0} - t_1$).

The first wireless delay response (W-Dresp) message 709 further comprises an accumulated delay from the previous hop, $D_{0,1}$. Because the first hybrid TSN node 701 is the first hop, there is no accumulated delay from previous hops, consequently, the accumulated delay from the previous hop, $D_{0,1}$ equals zero (i.e. $D_{0,1} = 0$).

The first wireless node 702 receives the first wireless delay response (W-Dresp) message 709 at time $t_{8,1}$ and subsequently computes the time offset with respect to the first hybrid TSN node 701 based on a first received message, a second transmitted message, and a third received message between the first hybrid TSN node 701 and the first wireless node 702. In this case, the first wireless node 702 computes a time offset with respect to the first hybrid TSN node 701 based on the first wireless synchronization (W-Sync) message 705, the first wireless delay request (W-Dreq) message 706, and the first wireless delay response (W-Dresp) message 709.

The first wireless node 702 calculates the offset between the first hybrid TSN node 701 (i.e. hop 0) and the first wireless node 702 (i.e. hop 1) according to:

$$\text{Offset } [1,0] = 0.5 \times [(t_2 - t_1) - (t_{4,0} - t_{3,1})]$$

Where:
$t_2$ is the time at which the first wireless node 702 received the first message (i.e. the first wireless synchronization (W-Sync) message 705);

$t^1$ is time at which the first hybrid TSN node 701 transmitted the first message (i.e. the first wireless synchronization (W-Sync) message 705);

$t_{4,0}$ is the time at which the first hybrid TSN node 701 received the second message from the first wireless node 702 (i.e. the first wireless delay request (W-Dreq) message 706); and $t_{3,1}$ is the time at which the first wireless node 702 transmitted the second message (i.e. the first wireless delay request (W-Dreq) message 706).

After receiving the first wireless delay response (W-Dresp) message 709, the first wireless node 702 synchronizes its clocks with the first hybrid TSN node 701 by subtracting the calculated offset from its local clock and transmits a second wireless delay response (W-Dresp) message 710 at time $t^{9,1}$.

The second wireless delay response (W-Dresp) message 710 comprises an accumulated delay from the previous hops, $D_{1,2}$. The accumulated delay represents the total propagation delay from the TSN grand master to the node in question. The accumulated delay, $D_{1,2}$ is calculated by adding the accumulated delay up to the first hybrid TSN node 701 received in the first wireless delay response (W-Dresp) message 709 (i.e. $D_{0,1}$) to the propagation delay between the first hybrid TSN node 701 and the first wireless node 702. In this case, the accumulated delay up to the first wireless node i.e., $D_{1,2}$ is calculated according to:

$$D_{1,2} = D_{0,1} + PD_{0,1}$$

Where:
$PD_{0,1}$ is the propagation delay between the first hybrid TSN node 701 and the first wireless node 702 and is calculated according to:

$$PD_{0,1} = 0.5 \times [(t_{4,0} - t_{3,1}) + (t_2 - t_1)]$$

As will be noted from FIG. 7, the first wireless node 702 has each of the parameters necessary to calculate the accumulated delay up to the first wireless node i.e., $D_{1,2}$. For example, accumulated delay $D_{0,1}$ is received in the first wireless delay response (W-Dresp) message 709. The second and third times ($t_2$ and $t_{3,1}$) are generated locally and the first and fourth times ($t_1$ and $t_{4,0}$) are received in the first wireless synchronization (W-Sync) message 705 and the first wireless delay response (W-Dresp) message 709 respectively.

The second wireless delay response (W-Dresp) message 710 also comprises a correction factor for the first wireless node 702, $CF_1$, calculated according to a time difference between transmissions of the first wireless node 701 (i.e. $t_{9,1} - t_{3,1}$). In this case $CF_1 = t_{9,1} - t_{3,1}$. The second wireless delay response (W-Dresp) message 710 also comprises the time at which the first wireless node 702 received the second wireless delay request (W-Dreq) message 707, i.e. $t_{6,1}$.

After receiving the second wireless delay response (W-Dresp) message 710 the second wireless node 703 (i.e. hop 2) computes a time offset and a rate offset with respect to the first hybrid TSN node 701 (i.e. hop 0) according to:

$$\text{Offset } [2,0] = 0.5 \times [(t_{4,2} - t_{3,1}) - (t_{6,1} - t_{5,2})] + [RT_1 + D_{1,2}] \times CF_1/(t_{10,2} - t_{4,2})$$

Where:
$RT_1 = (t_{3,1} - t_2)$;
$D_{1,2} = D_{0,1} + PD_{0,1}$, such that $PD_{0,1} = 0.5 \times [(t_{4,0} - t_{3,1}) + (t_2 - t_1)]$; and
$CF_1 = (t_{9,1} - t_{3,1})$.

Once the offset between the second wireless node 703 and the first hybrid TSN node 701 has been calculated, the second wireless node 703 is time synchronized with the first hybrid TSN node 701 and the second wireless node 703 transmits a third wireless delay response (W-Dresp) message 711 at time $t_{11,2}$.

In response to receiving the third wireless delay response (W-Dresp) message 711 the second hybrid TSN node 704 calculates the overall offset with respect to the first hybrid TSN node 701 according to:

$$\text{Offset } [3,0] = 0.5 \times [(t_{6,3} - t_{5,2}) - (t_{8,2} - t7,_3)] + [RT_2 + D_{2,3}] \times CF_2/(t_{12,3} - t_{6,3}),$$

Where:
$RT_2 = (t_{5,2} - t_{4,2})$;
$D_{2,3} = D_{1,2} + RT_1 + PD_{1,2}$, such that $PD_{1,2} = 0.5 \times [(t_{6,1} - t_{5,2}) + (t_{4,2} - t_{3,1})]$; and
$CF_2 = (t_{11,2} - t_{5,2})$.

Once the offset between the second hybrid TSN node 704 (i.e. hop 3) and the first hybrid TSN node 701 (i.e. hop 0) has been calculated, the second hybrid TSN node 704 is time synchronized with the first hybrid TSN node 701. Following time synchronization by the second hybrid TSN node 704, each node in the wireless network is synchronized to the first hybrid TSN node 701. Consequently, when a TSN end station synchronises to the second hybrid TSN node 704, the TSN end station will be synchronized to the first hybrid TSN node 701, which may be synchronized with a TSN grandmaster using conventional means as described above. In this way, a TSN end station can be synchronized with a TSN grand master across the wireless network.

FIG. 8A shows a method of initiating time synchronization in a wireless network comprising transparent clocks according to an embodiment. FIG. 8A summarises the flow of messages between each node in the wireless network as described in relation to FIG. 7.

The method begins in step 801 by the initiator starting the time synchronization procedure. Optionally, the initiator begins time synchronization in response to receiving a synchronisation message from a system synchronized with a TSN grand master. In FIG. 7 the initiator is the first hybrid TSN node 701. In step 802 the initiator node (i.e. the first hybrid TSN node 701) transmits a wireless synchronization (W-Sync) message at time $t_1$ (e.g. the first wireless synchronization (W-Sync) message 705) comprising a hop count, Hc, set equal to zero and the time of transmission, $t_1$.

In step 803 a node receives the wireless synchronization (W-Sync) message transmitted in step 802 and generates a timestamp to indicate the time of reception. In step 804 the node receiving the wireless synchronization (W-Sync) message increments the hop count, Hc, value received in the wireless synchronization (W-Sync) message and transmits a wireless delay request (W-Dreq) message comprising the incremented hop count value.

FIG. 8B shows a second part of the method of time synchronization in a wireless network comprising transparent clocks according to an embodiment. FIG. 8B summarises the flow of messages between each node in the wireless network as described in relation to FIG. 7.

In step 805 a node receives the wireless delay request (W-Dreq) and generates a timestamp indicating the time of reception. The action taken next by the node will depend on whether the node has previously transmitted a wireless synchronization (W-Sync) message or a wireless delay request (W-Dreq) message.

If the node that receives the wireless delay request (W-Dreq) message has not previously transmitted a wireless synchronization (W-Sync) message or a wireless delay request (W-Dreq) message then the node increments the hop count, Hc, value received in the wireless delay request (W-Dreq) message and transmits a further wireless delay request (W-Dreq) message. The node also computes a value for the residence time, RT, parameter in step 809 based on the difference between receiving the wireless delay request (W-Dreq) message in step 805 and transmitting the further delay request (W-Dreq) message in step 808 and includes this value in the transmitted further delay request (W-Dreq) message.

Although not shown in FIG. 8A, the residence time, RT, parameter is also calculated in step 804 and included in the wireless delay request (W-Dreq) message transmitted in step 804. However, in that case the residence time is calculated according to the time difference between receipt of the wireless synchronization (W-Sync) message in step 803, and the transmission of the wireless delay request (W-Dreq) message in step 804.

If on the other hand, the node has already transmitted a wireless synchronization (W-Sync) and the value of the hop count, Hc, received in the wireless delay request (W-Dreg) of step 805 is greater than the hop count, Hc, value of the node, then the node transmits a wireless delay response (W-Dresp) message in step 806. Before transmitting the wireless delay response (W-Dresp) message the node calculates a correction factor, CF, for computing the rate offset, and an accumulated propagation delay, D, up to the present node in step 807.

Upon receiving the wireless delay response (W-Dresp) message transmitted in step 806 a further node calculates the time and rate offset corrections as described above and time synchronizes the further node to the initiator at step 810.

The further node subsequently transmits a further wireless delay response (W-Dresp) in step 811 comprising updated parameters in response to: receiving the wireless delay response (W-Dresp) message transmitted in step 806; and receiving a wireless delay request (W-Dreq) message comprising a value of the hop count, Hc, one greater than the further node's hop count. Although not shown in FIG. 8, transmitting the further wireless delay response (W-Dresp) in step 811 also requires computing a new correction factor, CF, for computing the rate offset, and an accumulated propagation delay up to the present node, D as shown in step 807.

A further technique is also provided herein for performing time synchronization across a multi-hop wireless network. In this technique the properties of the communication protocol (i.e. the ability to provide a fixed, deterministic, Quality of Service) can be exploited for use when synchronizing time sensitive networks across a wireless network.

FIG. 9 shows a method of performing time synchronization across a multi-hop wireless network using deterministic Quality of Service (Qos) techniques according to an embodiment. FIG. 9 shows a first system 901 (index i–1) representing the Time Sensitive Network (TSN) grandmaster, a wireless network 902 (index i), and a second system 903 (index i+1) representing the Time Sensitive Network (TSN) end station. The wireless network 902 comprises a first hybrid TSN node 904, a second hybrid TSN node 905, and a plurality of wireless nodes 906.

In FIG. 9 the first hybrid TSN node 904 comprises an ingress port to communicate with the first system 901 (index i–1) and an egress port to communicate with the plurality of wireless nodes 906 in the wireless network 902 (index i). The first system 901 is either the TSN grandmaster, or is a system that is synchronized to the TSN grandmaster (e.g. by using generic Precision Time Protocol (gPTP) as described in IEEE 802.1AS). As a result, the ingress port of the first hybrid TSN node 904 has direct access to the Time Sensitive Networking (TSN) Grand Master time.

In FIG. 9, the second hybrid TSN node 405 comprises an ingress port for communication with the wireless nodes 906 of the wireless network 902, and an egress port to communicate with the second system 903 (index i+1), which represents the Time Sensitive Networking (TSN) end station. In FIG. 9 the second system 903 (i.e. the TSN end station) is time synchronized by the second hybrid TSN node 905, optionally by using generic Precision Time Protocol (PTP) as described in IEEE 802.1AS. The method of time synchronization show in FIG. 9 will now be discussed in further detail.

At a first time, $ts_1$, the first system 901 transmits a first SYNC message (SYNC_MSG) 907.

As discussed above in relation to FIG. 4, each SYNC message comprises a precise origin timestamp field, O, a correction field, C, and a rate ratio field, R, where: the precise origin timestamp field, O, indicates the time at the TSM Grandmaster time when the timing synchronisation information was originally sent, the correction field, C, indicates the difference between the precise origin timestamp and the synchronized time (i.e. the time at the grand master clock) when the SYNC message was transmitted, and the rate ratio (rateRatio) is the ratio of the grandmaster clock frequency to the frequency of the local clock at the time-aware system transmitting the SYNC message.

The first SYNC message (SYNC_MSG) 907 transmitted by the first system 901 (index i–1) comprises a correction field value calculated by the first system 901, and a rate ratio calculated by the first system 901, If the first system 901 is directly connected to the TSN grandmaster, then the precise origin timestamp field, O, equals the time of transmission of the first SYNC message (SYNC_MSG) 407, i.e. $O=ts_1$.

In the embodiment of FIG. 9, deterministic Quality of Service (QoS) techniques that are included as part of the design of the wireless network 902 are used to achieve timing synchronization across the wireless network. In FIG. 9 the protocol used for communication within the wireless network 902 provides a fixed residence time between the first hybrid TSN node 904 and the second hybrid TSN node 905 indicated by $T_{Res}$.

In FIG. 9 the value of the precise origin timestamp field, O, is communicated across the wireless network using a wireless message (W_Msg) 908. The wireless network 902 uses a multi-hop Time Division Multiple Access (TDMA) schedule 910 to communicate messages between each hop in the wireless network 902. Consequently, the time taken to transmit a message between the first hybrid TSN node 904 and the second hybrid TSN node 905 can be known a priori.

In this case, the second hybrid TSN node 905 synchronizes with the second system 903 (index i+1) by transmitting a second SYNC message 909 at time $ts_2$ comprising the precise origin timestamp, O, from the wireless message 908 and the first SYNC message 907 along with a value for the correction field, $C_i$, equal to the residence time in the wireless network (i.e. $T_{Res}$).

Optionally, the value of the correction field, C accounts for the correction field value calculated by the first system 901, $C_{i-1}$. More specifically, the correction field, $C_i$, equals the sum of the residence time in the wireless network (i.e. $T_{Res}$) and the correction field value calculated by the first system 901, $C_{i-1}$. In this embodiment the correction field value calculated by the first system 901, $C_{i-1}$, is communicated across the wireless network 902, optionally in the wireless message (W_Msg) 908.

In an embodiment the multi-hop Time Division Multiple Access (TDMA) schedule 910 is repeated a fixed number of times to guarantee successful delivery of the precise origin timestamp, O, between the first hybrid TSN node 904 and the second hybrid TSN node 905. That is, the schedule in which one message (e.g. the wireless message (W_Msg) 908) is communicated with across a network having a residence time ($T_{Res}$) is repeated a number of times.

FIG. 10 shows a method of performing time synchronization across a multi-hop wireless network using deterministic Quality of Service (QoS) techniques according to an embodiment. In FIG. 10 the communication protocol used by the wireless network 902 provides a maximum delay, $T_D$, for transporting a message from the first hybrid TSN node 904 to the second hybrid TSN node 905. That is, the communication protocol used by the wireless network 902 guarantees that a message transmitted by the first hybrid TSN node 904 will be received by the second hybrid TSN node 905 within a maximum delay, $T_D$.

Similarly to FIG. 9, a first SYNC message (SYNC_MSG) 907 is transmitted by the first system 901 at a first time, $ts_1$. The first SYNC message (SYNC_MSG) 907 comprises a precise origin timestamp, O, a correction field, C, and a rate ratio field, R, as described above.

In response to receiving the first SYNC message (SYNC_MSG) 907 at the ingress port, the first hybrid TSN node 904 determines a target egress time, $T_{egress}$, for the egress of a time synchronization message from the wireless network 902 based on the maximum delay, $T_D$, of the wireless network 902. The target egress time, $T_{egress}$, is computed such that $T_{egress} > T_D + T_{ingress}$ where $T_D$ is the maximum delay associated with the wireless network 902 for communicating a message between the first hybrid TSN node 904 and the second hybrid TSN node 905, and $T_{ingress}$ is the time when the first SYNC message (SYNC_MSG) 907 is received by the first hybrid TSN node 904.

In the embodiment of FIG. 10 a first message (W_Msg1) 1001 is transmitted by the first hybrid TSN node 904 comprising the precise origin timestamp, O, (e.g. the TSN Grand Master time) and a difference between the egress time and the ingress time (i.e. $T_{egress} - T_{ingress}$). The first hybrid TSN node 904 subsequently transmits a second message (W_Msg2) 1002 comprising the target egress time, $T_{egress}$.

The first message (W_Msg1) 1001 and the second message (W_Msg2) 1002 subsequently propagate across the multi-hop wireless network until they are received by second hybrid TSN node 905. The second hybrid TSN node 905 waits until the egress time, $T_{egress}$, before transmitting a second SYNC message 909 to the second system 903 comprising a value for the correction field, $C_i$, equal to the difference between the ingress time and the egress time (i.e. $T_{egress} - T_{ingress}$).

In an embodiment the second hybrid TSN node 905 applies a correction for the rate offset between the first hybrid TSN node 904 and the second hybrid TSN node 905 based on the first message (W_Msg1) 1001 and the second message (W_Msg2) 1002 in the same manner as described in relation to FIG. 4. Specifically, by timestamping receipt of the first message (W_Msg1) 1001, determining a transmission time of the first message (W_Msg1) 1001 based on the received timestamp and properties of the communication schedule, timestamping receipt of the second message (W_Msg2) 1002 and determining a transmission time of the second message (W_Msg2) 1002 based on the received timestamp and properties of the communication schedule. Based on these values the difference in clock rate, i.e. the rate offset, between the first hybrid TSN node 904 and the second hybrid TSN node 905 is determined.

FIG. 11A shows a wireless node according to an embodiment. The node 1100 comprises an input/output module 1110, a processor 1120 and a non-volatile memory 1130. The input/output module 1110 is communicatively connected to an antenna 1150. The antenna 1150 is configured to receive signals from, and transmit signals to, other wireless nodes. The processor 1120 is coupled to the input/output module 1110 and to the non-volatile memory 1130. The non-volatile memory 1130 stores computer program instructions that, when executed, cause the processor 1120 to execute program steps that implement the methods of timing synchronization described herein. In this configuration the node 110 has similar functionality to the wireless nodes of the wireless network.

In an embodiment, the node 1100 comprises a Time Sensitive Network (TSN) interface 1140. The Time Sensitive Network (TSN) interface 1140 enables the node 1100 to communicate timing information with a Time Sensitive Network (TSN), e.g. a TSN grandmaster and a TSN end station. Optionally the Time Sensitive Network (TSN) interface 1140 is a wired connection and communicates with an intermediary e.g. a first system 401 and a second system 403 which are each connected to a TSN grand master and TSN end station. In this configuration the node 110 has similar functionality to the first and second hybrid TSN nodes.

Whilst in the embodiment described above the antenna 1150 is shown to be situated outside of, but connected to, the node 1100 it will be appreciated that in other embodiments the antenna 1150 forms part of the node 1100. Furthermore, although in FIG. 11A only a single antenna 1150 is shown it is emphasized that the input/output module 1110 may comprise a plurality of antennas.

FIG. 11B shows a system for communicating with a hybrid TSN node according to an embodiment. The system 1160 comprises an input/output module 1170, a processor 1180 and a non-volatile memory 1190. The processor 1180 is coupled to the input/output module 1170 and to the non-volatile memory 1190. The non-volatile memory 1190 stores computer program instructions that, when executed, cause the processor 1180 to execute program steps that implement the methods of timing synchronization described herein. The input/output module 1170 is adapted to be communicatively coupled to a hybrid TSN node, optionally via a wired connection. The system further comprises a Time Sensitive Networking (TSN) interface 1195 that is configured to receive timing information from a TSN grand master and transmit timing information to a TSN end station. In this configuration the system 1160 has similar functionality to the first and second systems shown in FIG. 4.

In one embodiment the Time Sensitive Network (TSN) interface 1195 is connected to an actuator and/or sensor for use in monitoring and controlling an industrial process. The sensor and/or actuator node may be configured to perform any number of functions including, but not limited to, quality control, predictive machinery maintenance and factory safety.

Other uses outside of an industrial process are of course also possible. In fact, the methods and devices that are described herein can relate generally to any wireless network where time synchronization is required.

The embodiments presented herein may generally be referred to as "X-Synch-W" (Cross (X)-system TSN time synchronization over Wireless). The embodiments described above provide a time synchronization mechanism for converged operation of TSN and wireless systems. X-Synch-W has been designed to provide time synchronization between TSN and high-performance wireless systems in a range of operational scenarios. Some embodiments of X-Synch-W have been designed specifically for low-power wireless systems like GALLOP while others can be generalized to any other non-3GPP wireless system.

X-Synch-W has been designed to cater for the requirements of a wide range of integrated wired-wireless TSN systems. It implements different clock models including boundary clock and transparent clock approaches. In some embodiments, it provides transport of TSN time synchronization over a multi-hop wireless segment of a hybrid wired/wireless TSN system. In some embodiments, it provides a timestamping based multi-hop time synchronization functionality in hybrid wired/wireless TSN systems. Certain embodiments leverage deterministic connectivity for achieving time synchronization in hybrid wired/wireless TSN systems with minimal complexity.

The following features of X-Synch-W will be apparent to the reader:

Multi-hop Time Synchronization Transport—In some embodiments, X-Synch-W provides transport of time synchronization information over a multi-hop wireless segment of a hybrid wired-wireless TSN system.

Multi-hop Timestamping—In some embodiments, X-Synch-W provides multi-hop time synchronization in integrated wired-wireless TSN systems through exchange of timestamps over the wireless segment.

Deterministic QoS for Time Synchronization—In some embodiments, X-Synch-W provides a deterministic quality-of-service (QoS) framework for transporting time synchronization information over a single-hop or multi-hop wireless segment of a hybrid wired-wireless TSN system. This deterministic QoS framework provides a fixed residence time in the wireless segment or maximum transmission latency for facilitating transport of time synchronization information. Existing wireless time synchronization approaches rarely focus on resource allocation aspects for achieving time synchronization.

Boundary and Transparent Clocks—X-Synch-W implements two different types of clock solutions for time synchronization. In some embodiments, X-Synch-W provides a boundary clock solution wherein a wireless node has direct access to TSN grandmaster clock and it synchronizes other wireless nodes based on non-802.1AS techniques. In other embodiments, X-Synch-W implements a transparent clock approach wherein 802.1AS time synchronization messages are transported over a wireless network with necessary correction factors.

In particular it will be appreciated that:

X-Synch-W provides flexibility of time synchronization in hybrid wired-wireless system under a range of operational scenarios and clock models.

X-Synch-W provides the capability of correcting over-the-air errors accumulated in multi-hop operation.

X-Synch-W can be extended to a range of wireless systems for integrated wired-wireless TSN deployments. Certain embodiments can be extended to low-power wireless systems like GALLOP.

Some embodiments of X-Synch-W provide faster convergence for time synchronization as compared to conventional approaches.

X-Synch-W provides the foundation for realizing a 'wireless TSN' solution.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method for a system including a first wireless node and a second wireless node, the method comprising:
    receiving, by the first wireless node, a first synchronization message including an original timestamp;
    transmitting, by the first wireless node, a first message at a first time, the first message including a first timestamp, a relay counter parameter, and an offset parameter, the relay counter parameter indicating a number of wireless nodes that the original timestamp has traversed, the offset parameter indicating a time difference between receiving the first synchronization message and transmitting the first message, the first timestamp indicating the original timestamp;
    receiving, by the second wireless node, the first message at a second time;
    transmitting, by the second wireless node, a second message at a third time in response to receiving the first message, the second message including a second timestamp;
    transmitting, by the first wireless node, a third message;
    receiving by the second wireless node, the third message; and
    generating a timing correction value based, in part, on the contents of the first message, the second message and the third message.

2. The method according to claim 1, further comprising:
    receiving, by the first wireless node, the second message at a fourth time; and wherein:
    the first timestamp indicates the first time;
    the second timestamp indicates the third time;
    the third message is transmitted by the first wireless node in response to receiving the second message, wherein:

the third message includes a third timestamp indicating the fourth time; and
the generating the timing correction value includes:
calculating, by the second wireless node, a timing offset between the first wireless node and the second wireless node based on a difference between: the second time minus the first time; and the fourth time minus the third time.

3. The method according to claim 2, wherein the system further includes a third wireless node and the method further comprises:
receiving, by the third wireless node, the second message at a fifth time;
transmitting, by the third wireless node, a fourth message at a sixth time in response to receiving the second message;
receiving, by the second wireless node, the fourth message at a seventh time;
transmitting, by the second wireless node, a fifth message at an eight time in response to receiving the fourth message and the third message, the fifth message including a fourth timestamp indicating the seventh time;
receiving, by the third wireless node, the fifth message at a ninth time; and
calculating, by the third wireless node, a timing offset between the first wireless node and the third wireless node.

4. The method according to claim 3, wherein the timing offset between the first wireless node and the third wireless node includes a time offset and a rate offset.

5. The method according to claim 4, wherein the timing offset between the first wireless node and the third wireless node is calculated based on a difference between: the fifth time minus the third time; and the seventh time minus the sixth time.

6. The method according to claim 4, wherein:
the second message includes a residence time parameter indicating the difference between the third time and the second time;
the fifth message includes an accumulated delay parameter based on a propagation delay between the first wireless node and the second wireless node; and the method further comprises:
calculating the rate offset by adding the residence time parameter to the accumulated delay parameter and multiplying the sum by a clock rate of the second wireless node relative to the third wireless node.

7. The method according to claim 6, further comprising calculating the clock rate of the second wireless node relative to the third wireless node based on a difference between the eighth time and the third time relative to a difference between the ninth time and the fifth time.

8. The method according to claim 3, wherein the fifth message includes information on a correction field ($CF_1$) indicating the difference between the eighth time and the third time.

9. The method according to claim 2, further comprising time synchronizing the second wireless node to the first wireless node based on the timing offset between the first wireless node and the second wireless node.

10. The method according to claim 1, wherein:
the second message further includes the offset parameter and the relay counter parameter, wherein a value of the relay counter indicates a value of the relay counter parameter received in the first messaged incremented by one.

11. The method according to claim 10, wherein the system further includes a hybrid node, and a plurality of other wireless nodes, and the method further comprises:
receiving, by a node in the plurality of other wireless nodes, the second message; and
relaying, by the plurality of other wireless nodes, the second message across the wireless network wherein each node in the plurality of other wireless nodes increments the value of the relay counter upon relaying the second message;
receiving, by the hybrid node, the second message at a sixth time; and
transmitting, by the hybrid node, a second synchronization message at a seventh time, the second synchronization message including:
the original timestamp; and
a correction value based on the offset parameter received in the second message and a propagation delay across the wireless network wherein:
the propagation delay is determined based on the value of the relay counter in to second message and a property of the communication schedule.

12. The method according to claim 11, wherein the communication schedule is a Time Divisional Multiple Access schedule including a plurality of timeslots, in which each timeslot of the plurality of timeslots has a slot duration and each timeslot of the plurality of timeslots is separated in time from an adjacent timeslot by a guard duration; and wherein:
the propagation delay is calculated based on the value of the relay counter in the second message, the slot duration and the guard duration.

13. The method according to claim 11, wherein the propagation delay is calculated according to: $(Rc+1) \times T_{slot} + (Rc+T_{guard})$, where Rc is the value of the relay counter in the second message, $T_{slot}$ is the slot duration, and $T_{guard}$ is the guard duration.

14. The method according to claim 11, wherein:
the communication schedule is generated by flooding;
the first wireless message and the second message have a fixed length;
the second wireless node transmits the second message immediately after receiving the first message;
each node in the plurality of other wireless nodes transmits the second message immediately after receiving the second message; and wherein:
the propagation delay is calculated based on a value of the relay counter and a time taken to communicate a message having the fixed length.

15. The method according to claim 14, wherein the propagation delay is calculated according to $T_{ref} = (Rc+1) \times T_{slot}$ where Rc is the value of the relay counter in the second message, and $T_{slot}$ indicates the time taken to communicate the message having the fixed length.

16. The method according to claim 15, wherein each node in the other wireless nodes transmits the second wireless message a predetermined maximum number of times.

17. The method according to claim 11, wherein the third message further includes a second relay counter parameter; and the method further comprises;
relaying, by the second wireless node and the other wireless nodes, the third message across the wireless network wherein each node increments a value of the second relay counter parameter upon relaying the third message;
receiving, by the hybrid node, the third message at an eighth time; and transmitting, by the hybrid node, a third synchronization message including a rate ratio indicating a difference in clock rate between the first wireless node and the hybrid node.

18. The method according to claim 17, wherein the third message is transmitted at a ninth time and the method further comprises:

calculating the rate ratio according to a difference between the ninth time and the first time divided by a difference between the eighth time and the sixth time.

19. A system in a wireless network, the system comprising:

a first wireless node configured to:

receive a first synchronization message including an original timestamp;

transmit a first message at a first time, the first message including a first timestamp, a relay counter parameter, and an offset parameter, the relay counter parameter indicating a number of wireless nodes that the original timestamp has traversed, the offset parameter indicating a time difference between receiving the first synchronization message and transmitting the first message, the first timestamp indicating the original timestamp; and transmit, a third message;

a second wireless node, configured to:

receive the first message at a second time;

transmit a second message at a third time in response to receiving the first message, the second message including a second timestamp;

receive the third message;

and wherein the system is configured to:

generate a timing correction value based, in part, on the contents of the first message, the second message and the third message.

20. The system according to claim 19 wherein:

the first timestamp indicates the first time;

the second timestamp indicates the third time; and wherein:

the first wireless node is configured to:

receive the second message at a fourth time; and transmit the third message in response to receiving the second message; wherein the third message includes a third timestamp indicating the fourth time; and the second wireless node is configured to:

generate the timing correction value by calculating a timing offset between the first wireless node and the second wireless nodes based on a difference between: the second time minus the first time; and the fourth time minus the third time.

* * * * *